(12) United States Patent
Haltom et al.

(10) Patent No.: US 12,319,244 B2
(45) Date of Patent: Jun. 3, 2025

(54) METHODS AND APPARATUS FOR PROVIDING COMPONENTS IN AN AUTONOMOUS VEHICLE

(71) Applicant: Nuro, Inc.

(72) Inventors: Marshall Dickens Haltom, San Francisco, CA (US); James C. Owens, Waterford, VA (US); Robert Jon Kon Kim, Palo Alto, CA (US)

(73) Assignee: NURO, INC., Mountain View, CA (US)

( * ) Notice: Subject to any disclaimer, the term of this patent is extended or adjusted under 35 U.S.C. 154(b) by 7 days.

(21) Appl. No.: 18/170,901

(22) Filed: Feb. 17, 2023

(65) Prior Publication Data

US 2023/0264658 A1    Aug. 24, 2023

Related U.S. Application Data

(60) Provisional application No. 63/313,198, filed on Feb. 23, 2022.

(51) Int. Cl.
| | |
|---|---|
| *B60S 1/34* | (2006.01) |
| *B60S 1/02* | (2006.01) |
| *B60S 1/52* | (2006.01) |
| *B60S 1/08* | (2006.01) |
| *B60S 1/48* | (2006.01) |
| *B60S 1/50* | (2006.01) |
| *B60S 1/56* | (2006.01) |
| *B62D 29/04* | (2006.01) |

(52) U.S. Cl.
CPC ............ *B60S 1/3415* (2013.01); *B60S 1/023* (2013.01); *B60S 1/522* (2013.01); *B60S 1/0818* (2013.01); *B60S 1/485* (2013.01); *B60S 1/50* (2013.01); *B60S 1/56* (2013.01); *B60S 1/566* (2013.01); *B62D 29/043* (2013.01)

(58) Field of Classification Search
CPC .......... B60S 1/3415; B60S 1/023; B60S 1/56; B60S 1/522; B60S 1/566; B60S 1/485; B60S 1/50; B60S 1/0818; B62D 29/043
See application file for complete search history.

(56) References Cited

U.S. PATENT DOCUMENTS

| | | | |
|---|---|---|---|
| 2018/0009418 A1* | 1/2018 | Newman | B08B 5/02 |
| 2018/0334140 A1* | 11/2018 | Ghannam | B60S 1/52 |
| 2020/0262396 A1* | 8/2020 | Keller | B60S 1/60 |
| 2022/0105781 A1* | 4/2022 | Salter | G06V 20/59 |

* cited by examiner

*Primary Examiner* — Benjamin L Osterhout
(74) *Attorney, Agent, or Firm* — Edell, Shapiro & Finnan, LLC

(57) ABSTRACT

According to one aspect, a vehicle includes a chassis, a propulsion system carried on the chassis, a control system carried on the chassis, and a components arrangement carried on the chassis. The propulsion system configured to propel the vehicle, and the control system is configured to enable the vehicle to operate autonomously. The components arrangement includes at least a frame, a panel having a surface, a wiper arrangement having at least one wiper, and a fluid distribution arrangement. The frame is configured to interface with the chassis and to support the panel, the wiper arrangement, and the fluid distribution arrangement. The fluid distribution arrangement is configured to dispense a fluid onto the surface and the wiper is configured to sweep over the surface.

20 Claims, 20 Drawing Sheets

METHODS AND APPARATUS FOR PROVIDING COMPONENTS IN AN AUTONOMOUS VEHICLE

PRIORITY CLAIM

This patent application claims the benefit of priority under 35 U.S.C. § 119 to U.S. Provisional Patent Application No. 63/313,198, filed Feb. 23, 2022, and entitled "METHODS AND APPARATUS FOR PROVIDING COMPONENTS IN AN AUTONOMOUS VEHICLE," which is incorporated herein by reference in its entirety.

TECHNICAL FIELD

The disclosure relates to autonomous vehicles. More particularly, the disclosure relates to providing components in autonomous vehicles.

BACKGROUND

To safely deploy autonomous vehicles, the autonomous vehicles generally must comply with rules and regulations. Some rules and regulations may apply to substantially all vehicles, and other rules and regulations may apply specifically to autonomous vehicles. For example, rules and regulations generally stipulate that vehicles which have drivers include one or more seat belts as a safety measure to protect the drivers. If a vehicle is designed to be operated by an onboard driver, then the existence of a seat belt enhances the ability of the vehicle to protect the driver from injury. However, if a vehicle is designed such that the vehicles does not carry a driver or other occupant, the presence of one or more seat belts generally does not bear on an ability for the vehicle to operate safely.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
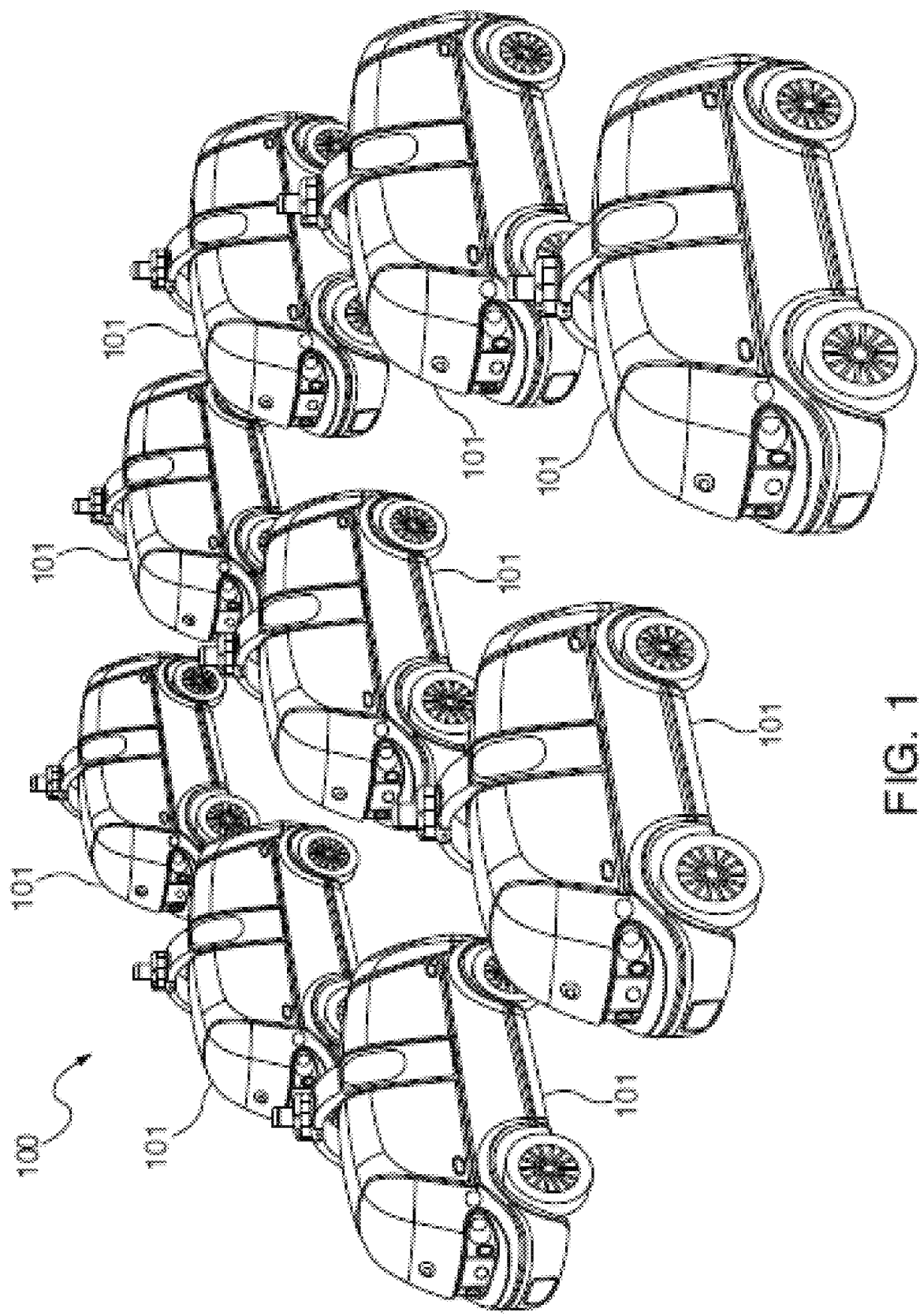
FIG. 1 is a diagrammatic representation of an autonomous vehicle fleet in accordance with an embodiment.

In one embodiment, a vehicle includes a chassis, a propulsion system carried on the chassis, a control system carried on the chassis, and a components arrangement carried on the chassis. The propulsion system configured to propel the vehicle, and the control system is configured to enable the vehicle to operate autonomously. The components arrangement includes at least a frame, a panel having a surface, a wiper arrangement having at least one wiper, and a fluid distribution arrangement. The frame is configured to interface with the chassis and to support the panel, the wiper arrangement, and the fluid distribution arrangement. The fluid distribution arrangement is configured to dispense a fluid onto the surface and the wiper is configured to sweep over the surface.

According to another embodiment, an apparatus includes a support structure, a panel having a first vehicle and supported on or by the support structure, aa wiper arrangement supported on or by the support structure, and a fluid distribution arrangement supported on or by the support structure. The wiper arrangement includes at least one wiper and an actuator, with the actuator configured to be actuated to cause the at least one wiper to move over the first surface. The fluid distribution arrangement is configured to cause a fluid to be dispensed onto the first surface.

In accordance with still another embodiment, a method includes obtaining a components arrangement and coupling the components arrangement to an interface of a vehicle.

The components arrangement includes at least a frame, a panel having a surface, a wiper arrangement having at least one wiper, a fluid distribution arrangement, and at least one fastener. The frame is configured to support the panel, the wiper arrangement, and the fluid distribution arrangement. The fluid distribution arrangement is configured to dispense a fluid onto the surface and the wiper is configured to sweep over the surface.

An autonomous vehicle may include substantially all components and/or systems which enable the autonomous vehicle to comply with applicable rules and comply with applicable regulations. Some components, as for example components that generally do not affect the safe operation of an autonomous vehicle, may be grouped together as a part of an assembly or unit. The assembly or unit may be placed substantially anywhere in the autonomous vehicle. The components within the assembly or unit may generally be operational, and may be controlled by a computing system onboard the autonomous vehicle and/or by a teleoperations system.

DESCRIPTION

Rules and regulations generally exist to substantially ensure that vehicles travelling on roads are considered to be safe. In order to be compliant with applicable rules and to substantially meet applicable regulations, vehicle manufacturers may ensure that vehicles include systems on a vehicle that address rules and regulations.

Some rules and regulations may effectively require systems which are intended to ensure that vehicles may operate safely. In some situations, such rules and regulations may effectively have no effect on the ability for a particular vehicle to operate safely. For example, regulations generally specify that windshields of a certain strength be present on vehicles to enable drivers to see and to protect the drivers in the event that the windshields are subjected to a relatively high force. However, for occupantless vehicles, as there are no drivers and/or passengers onboard, the ability to be able to see through windshields and the ability to protect occupants in the event that windshields are subjected to a relatively high force may essentially be unnecessary. Further, systems such as windshield wipers and fluid dispensers may be substantially required on vehicles to ensure that windshields may be kept clean to enable drivers and/or passengers of the vehicles to be able to see their surroundings. However, as occupantless vehicles have not drivers or passengers, the ability to clean a windshield to enhance visibility through the windshield may essentially be unnecessary with respect to improving the safety of the vehicle.

Components of systems which generally do not affect the ability for a particular vehicle to operate safely may be included on the vehicle to allow the vehicle to substantially comply with rules and meet regulations. By including components on a vehicle which generally do not affect the safe operation of the vehicle, the vehicle may effectively meet regulations and, as a result, may be deployed or otherwise operate on roads. Such components may be provided in an enclosure or supported by a frame that is disposed on or in a vehicle, as for example on a chassis of the vehicle. It should be understood that such components are generally not utilized to enable the operation of a vehicle. That is, while such components are operational, the operation of such components neither enhances nor hinders the safe operation of the vehicle to operate. The operation of such components may be substantially controlled by systems within the vehicle such as an overall autonomy system, or may be substantially controlled by a remote operator such as a teleoperator.

An autonomous vehicle that may include components which allow the autonomous vehicle to comply with rules and meet regulations may be part of a fleet of vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
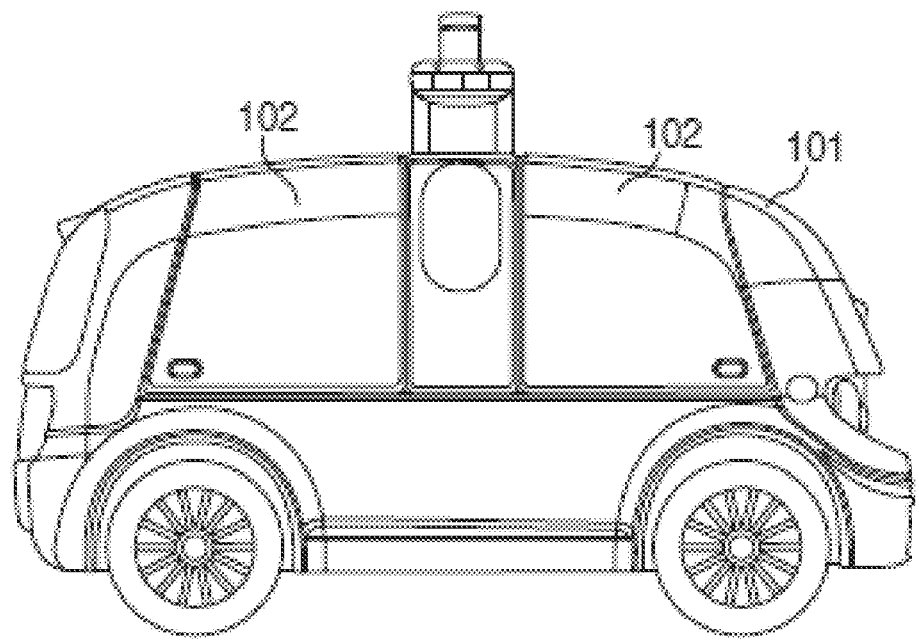
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
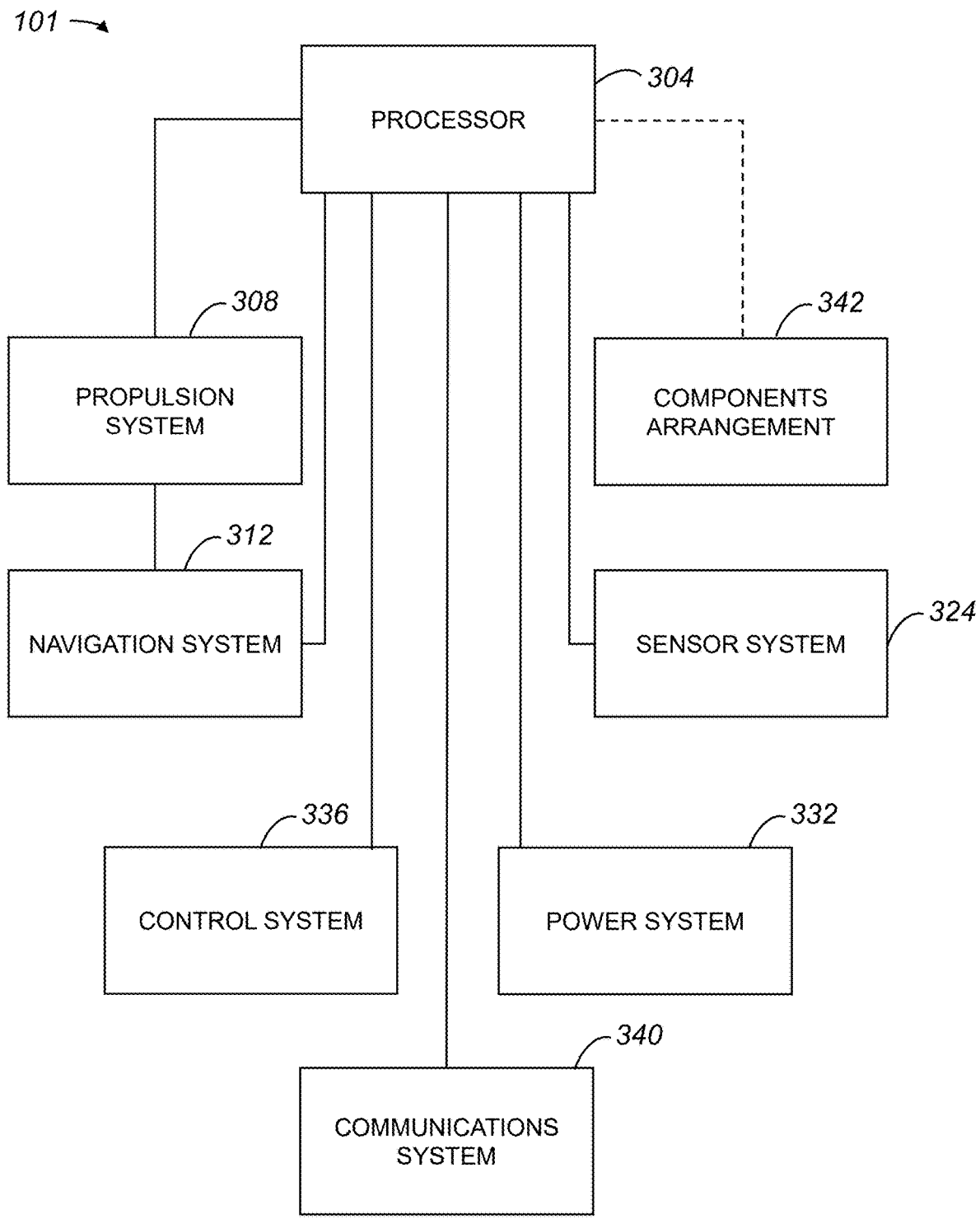
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, a communications system 340, and a components arrangement 342. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

Components arrangement 342 may be in communication with processor 304, although it should be appreciated that components arrangement 342 is not limited to being in communication with processor 304. Components arrangement 342 may include any suitable components. Components may include, but are not limited to including, a windshield, a mount for the windshield, a windshield wiper, a windshield fluid dispenser system, one or more cameras, one or more sensors, and/or a defroster. In one embodiment, components arrangement 342 includes an enclosure that is configured to contain the components.

Components that are a part of components arrangement 342 may be components which are included in autonomous vehicle 101 due to rules and/or regulations which effectively regulate the manufacture and operation of autonomous vehicle 101. However, the components that are included in components arrangement 342 generally do not have an effect on the ability for autonomous vehicle 101 to operate. By way of example, components of components agreement 342 may effectively be specified as vital or substantially mandatory by rules and regulations, but such components may not actually hinder or enhance the operation of autonomous vehicle 101.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Components arrangement 342 may be configured to include components which enable vehicle 101 to comply with rules and regulations regarding the operation of vehicle 101. Typically, components included in components arrangement 342 do not have a significant effect on the safe operation of vehicle 101. With respect to FIG. 4, components arrangement 342 will be described in accordance with an embodiment. Components arrangement 342 includes an enclosure 446 which substantially contains a fastener arrangement 448$a$, an optional communications arrangement 448$b$, a windshield assembly arrangement 448$c$, a defroster arrangement 448$d$, and a power arrangement 448$e$.

Enclosure 446 may be formed in any suitable shape, and from any suitable material, which enables enclosure 446 to contain fastener arrangement 448$a$, optional communications arrangement 448$b$, windshield assembly arrangement 448$c$, defroster arrangement 448$d$, and power arrangement 448$e$. In one embodiment, enclosure 446 may include one or more openings which enable, for example, a camera (not shown) which may be contained within enclosure 446 to effectively capture images of the environment external to enclosure 446. In another embodiment, enclosure 446 may be at least partially transparent, e.g., may include a substantially clear window, which may enable a camera (not shown) that is contained within enclosure 446 to capture images external to enclosure 446.

Fastener arrangement 448$a$ may include one or more physical mechanisms such as connectors that are arranged to enable components arrangement 342 to be secured to vehicle 101 of FIGS. 2 and 3. In one embodiment, fastener arrangement 448$a$ may enable components arrangement 342 to be relatively easily positioned within, readjusted within, and/or removed from vehicle 101 of FIGS. 2 and 3.

Optional communications arrangement 448$b$ is configured to enable information to be obtained by components arrangement 342, and to enable components arrangement 342 to provide data. For example, communications arrangement 448$b$ may obtain information from other systems of vehicle 101 of FIGS. 2 and 3, and may process the obtained information. Processing the obtained information may include, but is not limited to including, determining when to activate a function associated with using windshield assembly arrangement 448$c$ and/or defroster arrangement 448$d$, and activating the function using windshield assembly arrangement 448$c$ or defroster arrangement 448$d$.

Windshield assembly arrangement 448$c$ generally includes a windshield 450$a$, a windshield mount 450$b$, at least one windshield wiper 450$c$, a windshield fluid dispenser 450$d$, an actuator assembly 450$e$, and an optional sensor assembly 450$f$. Windshield 450$a$ may be formed from any suitable material which is typically used to form windshields, as for example laminated safety glass. In general, windshield 450$a$ may be formed from a sheet of laminated glass or from multiple glazed units. The width, height, length, thickness, and curvature of windshield 450$a$ may vary. The overall shape of windshield 450$a$ may also vary. Additionally, the strength of windshield 450$a$, or the amount of force which may be tolerated by windshield 450$a$, may also vary. Windshield mount 450$b$ is configured to support or to otherwise hold windshield 450$a$ in a desired position within enclosure 448$a$. Windshield wiper 450$c$ includes a wiper blade which is arranged to sweep over a surface of windshield 450$a$ to clear and/or clean windshield 450$a$. Windshield wiper 450$c$ may be configured to sweep over the surface of windshield 450$a$ at more than one speed, e.g., at two different speeds. Windshield fluid dispenser 450$d$ generally includes a reservoir configured to hold a cleaning fluid such as water, a pump, and a dispensing system such as a nozzle or a sprinkler configured to dispense the cleaning fluid substantially onto a surface of windshield 450$a$. Actuator assembly 450$e$ is arranged to cause windshield wiper 450$c$ to move over a surface of windshield 450$a$ and, in one embodiment, may effectively activate a pump in windshield fluid dispenser 450$d$. Actuator assembly 450$e$ may include a motor which is configured to operate to enable windshield wiper 450$c$ to move across the surface of windshield 450$a$ in more than one direction. Optional sensor assembly 450$f$ may include a rain and/or light sensor that may be used to effectively trigger actuator assembly 450$e$ such that windshield wiper 450$c$ may sweep across the surface of windshield 450$a$. In one embodiment, in lieu of optional sensor assembly 450$f$, actuator assembly 450$e$ may obtain signals from sensor system 324 of FIG. 3. It should be appreciated that windshield assembly arrangement 448$c$ may include a structure (not shown) which may allow windshield fluid dispensed by windshield fluid dispenser 450$d$ to be collected.

Defroster or defogger arrangement 448$d$ may be disposed on or in a vicinity of windshield 450$a$ such that defroster arrangement 448$d$ may provide heat to a surface of windshield 450$a$. The heat may be provided using any suitable method, and may generally cause condensation and/or frost to be moved from the surface of windshield 450$a$. In one embodiment, defroster arrangement 448$d$ may be a circuit substantially printed on or within windshield 450$a$. In another embodiment, defroster arrangement 448$d$ may include a positive temperature coefficient (PTC) heater.

Windshield assembly arrangement 448$c$ and defroster arrangement 448$d$ may each be triggered or otherwise activated at any suitable time and as appropriate for any given situation. For example, if vehicle 101 of FIGS. 2 and 3 is operating in weather conditions which include precipitation, windshield assembly arrangement 448$c$ may be triggered to cause actuator assembly 450$e$ to move windshield wiper 450$c$ across a surface of windshield 450$a$.

Power arrangement 448$e$ may be configured to provide power to components arrangement 342. For example, power arrangement 448$e$ may include a battery that substantially powers windshield assembly arrangement 448$c$ and defroster arrangement 448$d$. Alternatively, power arrangement 448$e$ may instead be an interface which is configured to draw or to otherwise obtain power, e.g., electrical power, from vehicle 101 of FIGS. 2 and 3.

In one embodiment, windshield assembly arrangement 448$c$ may include a sensor such as a camera (not shown) which is configured to effectively trigger actuator assembly 450$e$ to activate windshield wiper 450$c$ when precipitation such as rain is detected. In another embodiment, windshield assembly arrangement 448$c$ may use information obtained from a sensor system such as sensor system 324 as shown in FIG. 3 to cause actuator assembly 450$e$ to activate windshield wiper 450$c$ to substantially sweep across a surface of windshield 450$a$.

Figure 5:
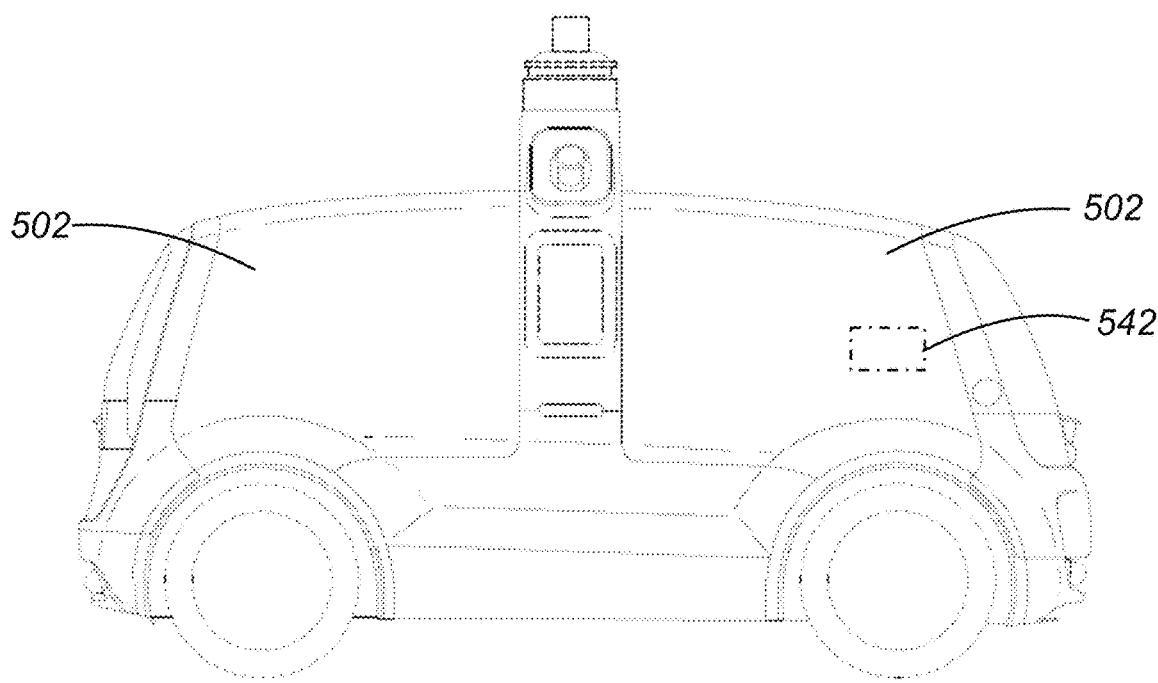
FIG. 5 is a diagrammatic representation of a vehicle with a components arrangement positioned in a compartment of the vehicle in accordance with an embodiment.

A components arrangement such as components arrangement 342 may be located, or disposed, substantially anywhere within or on a vehicle such as vehicle 101 of FIGS. 2 and 3. For example, a components arrangement may be disposed in a delivery compartment of a vehicle. FIG. 5 is a diagrammatic representation of a vehicle with a components arrangement positioned in a compartment of the vehicle in accordance with an embodiment. A vehicle 501, which may be an autonomous vehicle, includes compartments 502 which may be used to transport goods. As shown, a components arrangement 542 may be positioned in one of compartments 502. When components arrangement 542 is positioned in compartment 502, the removal and placement and components arrangement 542 may be facilitated.

Figure 6:
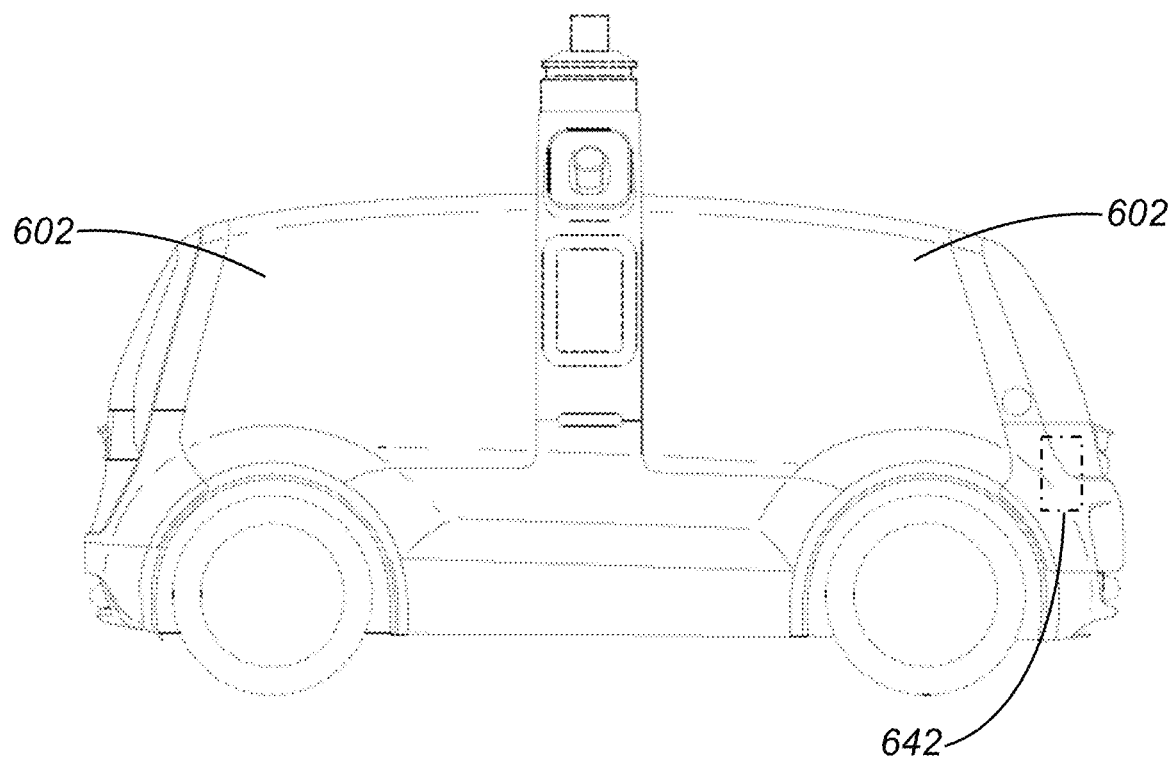
FIG. 6 is a diagrammatic representation of a vehicle with a components arrangement positioned in a body of the vehicle in accordance with an embodiment.

In lieu of being disposed in a compartment of a vehicle, a components arrangement may be located substantially anywhere within a body of the vehicle. That is, a components arrangement is not limited to being disposed in a compartment of a vehicle. FIG. 6 is a diagrammatic representation of a vehicle with a components arrangement positioned in a body of the vehicle in accordance with an embodiment. A vehicle 601, which may be an autonomous vehicle, includes compartments 602 which may be used to transport goods. A components arrangement 642 may be positioned in vehicle 601 such that components arrangement 642 is not within one of compartments 602. In one embodiment, components arrangement 642 may be located towards a front surface of vehicle 601. In one embodiment, when components arrangement 642 is located towards a front surface of vehicle 601, a windshield arrangement of components arrangement 642 may effectively be at or near a front of vehicle 601.

Figure 7:
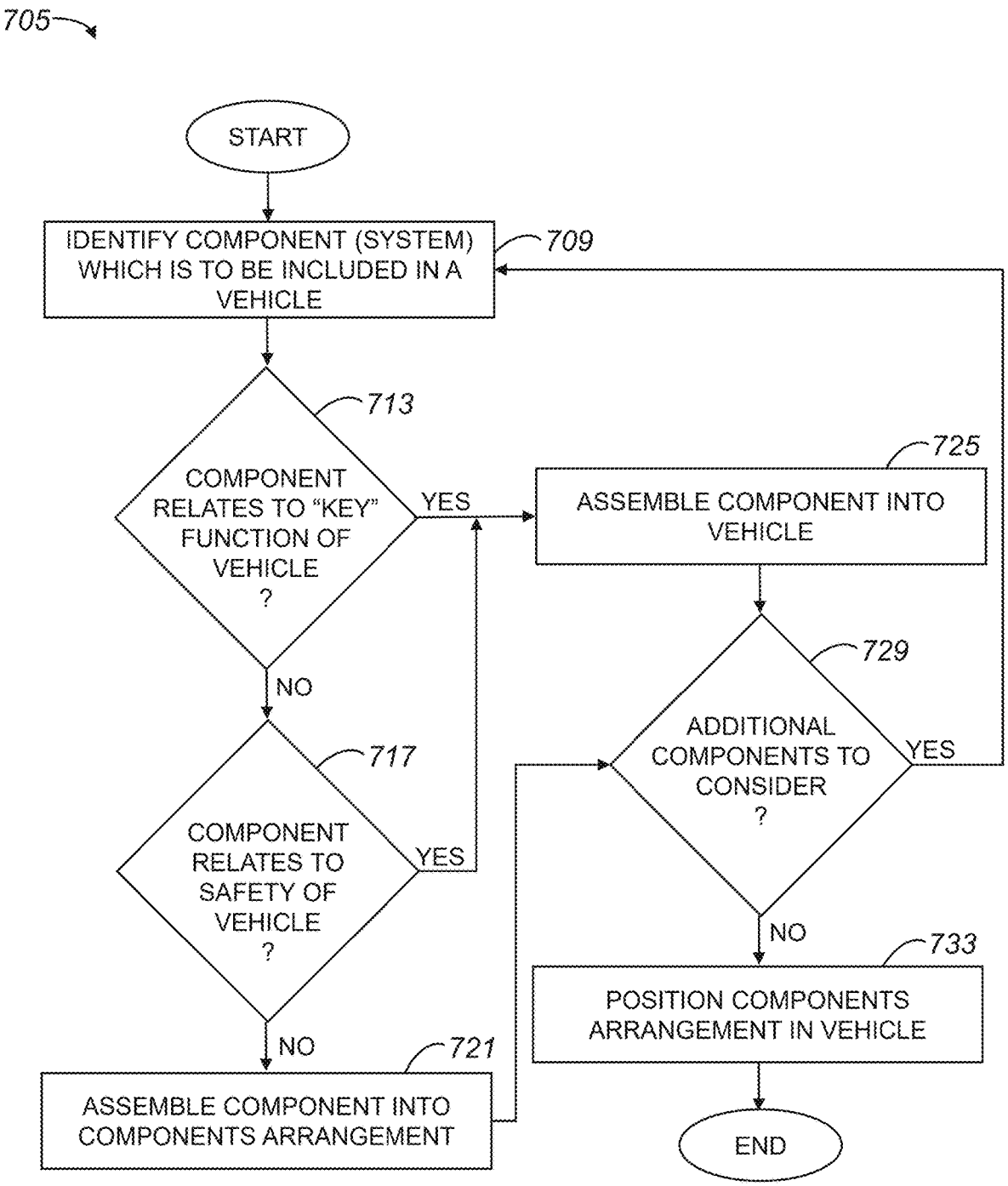
FIG. 7 is a process flow diagram which illustrates a first method of including a components arrangement in a vehicle in accordance with an embodiment.

FIG. 7 is a process flow diagram which illustrates a first method of including a components arrangement in a vehicle in accordance with an embodiment. A method 705 of including a components arrangement in a vehicle begins at a step 709 in which a component or a system that is to be included in a vehicle is identified. The component may be identified based on which components are generally expected to be included in a vehicle.

A determination is made in a step 713 as to whether the component identified in step 709 relates to a "key" function of the vehicle. For example, an assessment may be made to determine whether the component is critical, whether the component otherwise performs a relatively important or core function of the particular vehicle, whether the particular vehicle would be unable to operate without the component, and/or whether the component is effectively a backup to another component. If the determination is that the component does not relate to a key function of the vehicle, then a determination is made in a step 717 as to whether the component relates to the safety of the vehicle. In other words, it is determined whether the component is associated with a safety function of the vehicle or otherwise has a significant effect on the ability for the vehicle to operate safely.

Figure 4:
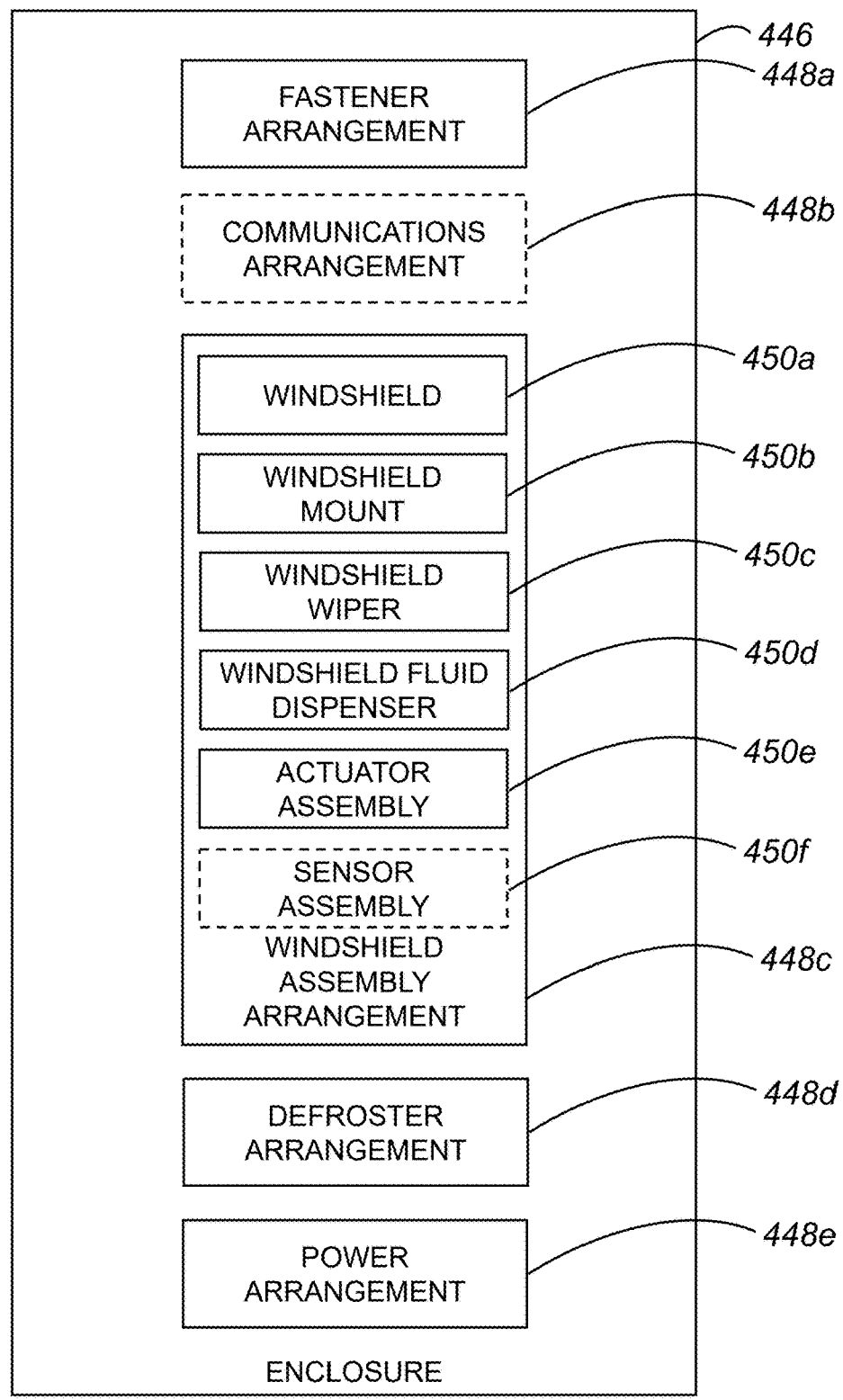
FIG. 4 is a block diagram representation of a components arrangement, e.g., components arrangement 342 of FIG. 3, in accordance with an embodiment.

If it is determined in step 717 that the component does not relate to, or otherwise have a significant effect on the ability for the vehicle to operate safely, the implication is that the component may be included in a components arrangement such as components arrangement 342 of FIGS. 3 and 4. As such, process flow moves from step 717 to a step 721 in which the component is assembled into a components arrangement. In general, the assembly the component into the components arrangement includes enabling the component to function as part of the components arrangement, Once the component is assembled into the components arrangement, a determination is made in a step 729 as to whether there are additional components to consider. That is, it is determined whether there are additional components which may potentially be added into the components arrangement. When it is determined that there are additional components which may potentially be added into the components arrangement, process flow returns to step 709 in which a component which is to be included in the vehicle is identified.

Alternatively, if it is determined in step 729 that there are no additional components to consider, the indication is that substantially all components associated with the vehicle are either assembled into the vehicle or included in the components arrangement. When there are no additional components to consider, the components arrangement is positioned in the vehicle in a step 733, and the method of including a components arrangement in a vehicle is completed.

Returning to step 717, if it is determined that a component relates to the safety of the vehicle, then process flow moves to a step 725 in which the component is assembled into the vehicle. In one embodiment, a component that is associated with the safe operation of the vehicle may be substantially directly integrated into the vehicle. After the component is assembled into the vehicle, process flow moves to step 729 in which it is determined whether there are additional components to consider.

Returning to step 713 and the determination of whether a component relates to a key function of the vehicle, if it is determined that the component relates to a key function of the vehicle, the indication is that the component is effectively integral to the vehicle. Accordingly, process flow moves from step 713 to step 725 in which the component is assembled into the vehicle.

Figure 8:
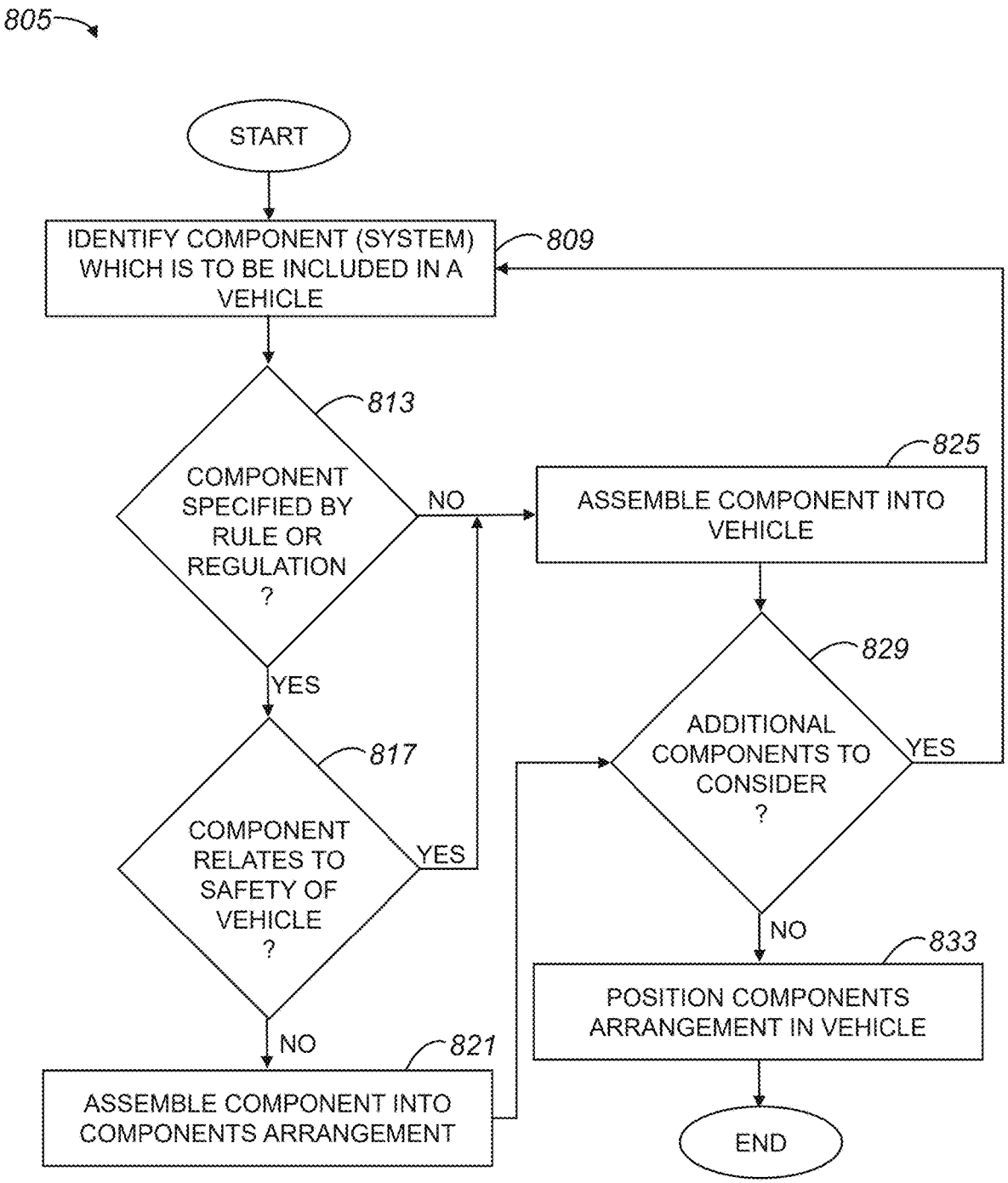
FIG. 8 is a process flow diagram which illustrates a second method of including a components arrangement in a vehicle in accordance with an embodiment.

As mentioned above, in some embodiments, some components may be included in a components enclosure of an autonomous vehicle when those components are effectively specified for inclusion by an applicable rule or regulation that relates to the autonomous vehicle. FIG. 8 is a process flow diagram which illustrates a method of including a components arrangement in a vehicle when one or more components are included to facilitate compliance with an applicable rule or regulation in accordance with an embodiment. A method 805 of including a components arrangement in a vehicle begins at a step 809 in which a component or a system that is to be included in a vehicle is identified.

It is determined in a step 813 whether the component identified in step 809 relates to a specification that is relevant to the vehicle. That is, it is determined whether the component is specified in a rule or a regulation that is applicable to the vehicle. If the determination is that the component relates to a specified rule or regulation, then a determination is made in a step 817 as to whether the component relates to the safety of the vehicle.

If it is determined in step 817 that the component does not relate to, or otherwise have a significant effect on the ability for the vehicle to operate safely, the implication is that the component may be included in a components arrangement such as components arrangement 342 of FIGS. 3 and 4. Hence, process flow moves from step 817 to a step 821 in which the component is assembled into a components arrangement. In general, the assembly the component into the components arrangement includes enabling the component to function as part of the components arrangement, After the component is assembled into the components arrangement, a determination is made in a step 829 as to whether there are additional components to consider. If it is determined that there are additional components which may potentially be added into the components arrangement, process flow returns to step 809 in which a component which is to be included in the vehicle is identified.

Alternatively, if the determination in step 829 that there are no additional components to consider, the indication is that substantially all components associated with the vehicle are either assembled into the vehicle or included in the components arrangement. When it is determined in step 829 that there are no additional components to consider, the components arrangement is positioned in the vehicle in a step 833, and the method of including a components arrangement in a vehicle is completed.

Returning to step 817, if it is determined that a component relates to the safety of the vehicle, then process flow moves to a step 825 in which the component is assembled into the vehicle. Once the component is assembled into the vehicle, process flow moves from step 825 to step 829 in which it is determined whether there are additional components to consider.

Referring back to step 813 and the determination of whether a component is specified for inclusion on a vehicle by an applicable rule or regulation, if the determination is that the component does not relate to an applicable rule or regulation, vehicle, the indication is that the component may be integrated substantially directly into the vehicle. As such, process flow moves from step 813 to step 825 in which the component is assembled into the vehicle.

Figure 9:
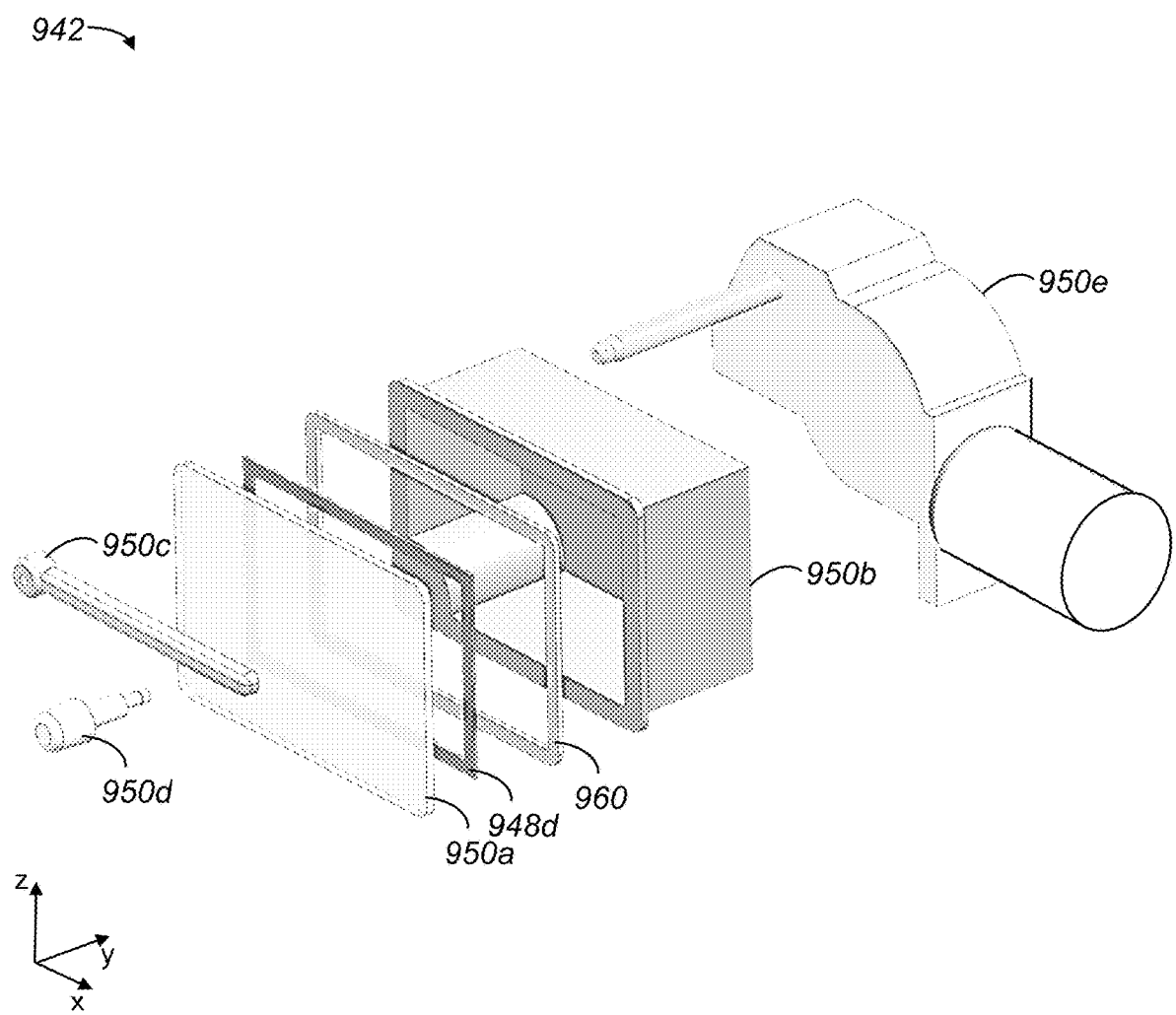
FIG. 9 is a diagrammatic exploded view representation of a components arrangement in accordance with an embodiment.

As mentioned above, a components arrangement may include a windshield assembly and a defroster assembly. FIG. 9 is a diagrammatic exploded view representation of a components arrangement that includes a windshield assembly and a defroster assembly in accordance with an embodiment, A components arrangement 942 includes a windshield 950a on which a wiper 950c is configured to move. Windshield 950a may be fabricated from glass such as laminated glass, and/or be formed from one or more glazed units. Wiper 950c is generally arranged to move back and forth across a surface of windshield 950a to remove debris and/or fluid from the surface. Wiper 950c may move at multiple different speeds, and is substantially powered by an actuator arrangement 950e. Actuator arrangement 950e may be a rotary motor that is configured to enable wiper 950c to move in two directions.

A nozzle arrangement 950d is configured to dispense a fluid, e.g., a cleaning fluid such as water, onto a surface of windshield 950a. In one embodiment, when nozzle arrangement 950d is effectively triggered to dispense a fluid, actuator arrangement 950e may effectively activate wiper 950c.

Components arrangement 942 also includes a defroster arrangement 948d. Defroster arrangement 948d may be a defroster circuit that is substantially printed on glazing of windshield 950a and/or may be an external heater.

An adhesive layer 960 effectively holds windshield 950a against a housing or bracket 950b that is configured to secure windshield 950a. It should be appreciated that in lieu of adhesive layer 960, a fastening mechanism may instead be used to substantially secure windshield 950a to housing 950b.

Figure 10:
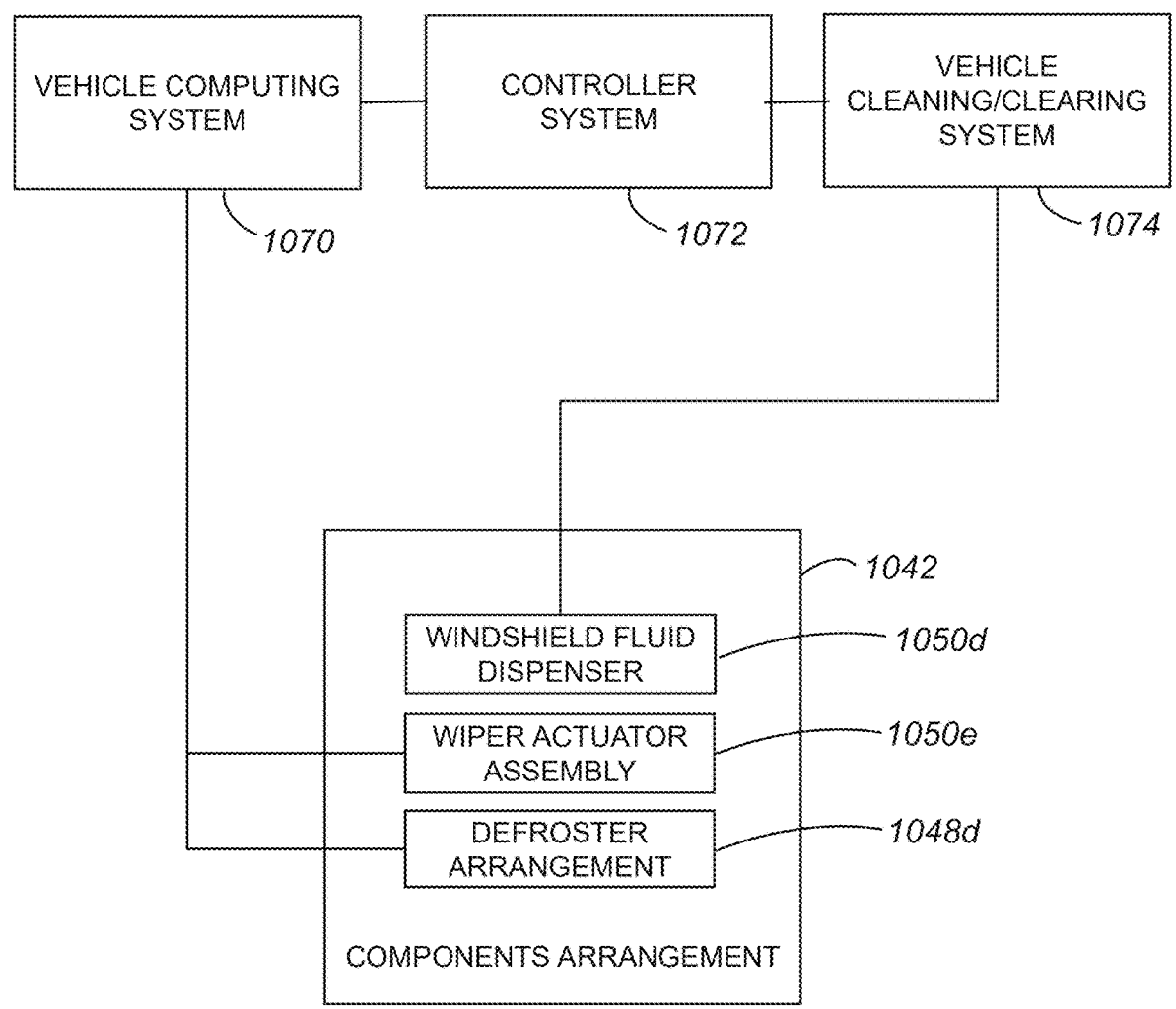
FIG. 10 is a block diagram representation of a first architecture which includes a components arrangement in accordance with an embodiment.

Within an autonomous vehicle, a components or systems included in a components arrangement may be triggered or otherwise activated by the autonomous vehicle. For example, control commands or signals may be provided to a components arrangement by a computing arrangement on a vehicle such as a body controller or body control module. Control commands may be provided to a components arrangement based on the architecture within an autonomous vehicle. FIG. 10 is a block diagram representation of a first architecture which includes a components arrangement in accordance with an embodiment. A first architecture 1068 includes a vehicle computing system 1070, a controller system 1072, a vehicle cleaning/clearing system 1074, and a components arrangement 1042.

Vehicle computing system 1070, which may be a body controller, may be configured to generate and to provide commands to controller system 1072 and to components arrangement 1042. The commands provided may be associated with an autonomy system included within, or in communication with, vehicle computing system 1070. In one embodiment, vehicle computing system 1070 may include circuitry configured to effectively activate components within components arrangement 1072. Controller system 1072 may be associated with triggering the cleaning and/or clearing of sensors (not shown) using vehicle cleaning/clearing system 1074.

Vehicle cleaning/clearing system 1074 is generally configured to include one or more fluid control units, fluid reservoirs, ducts and/or piping, valves, and fluid dispensers configured to clean and/or clear sensors, as for example sensors included in senor system 324 of FIG. 3. Vehicle cleaning/clearing system 1074 may trigger or otherwise control a windshield fluid dispenser 1050d of components arrangement 1042.

Commands intended to activate, as well as to deactivate, a wiper actuator assembly 1050e and a defroster arrangement 1048d of components arrangement 1042 may be provided by vehicle computing system 1070. In one embodiment, vehicle computing system 1070 may include drive circuits configured to effectively control wiper actuator assembly 1050e and defroster arrangement 1048d.

Figure 11:
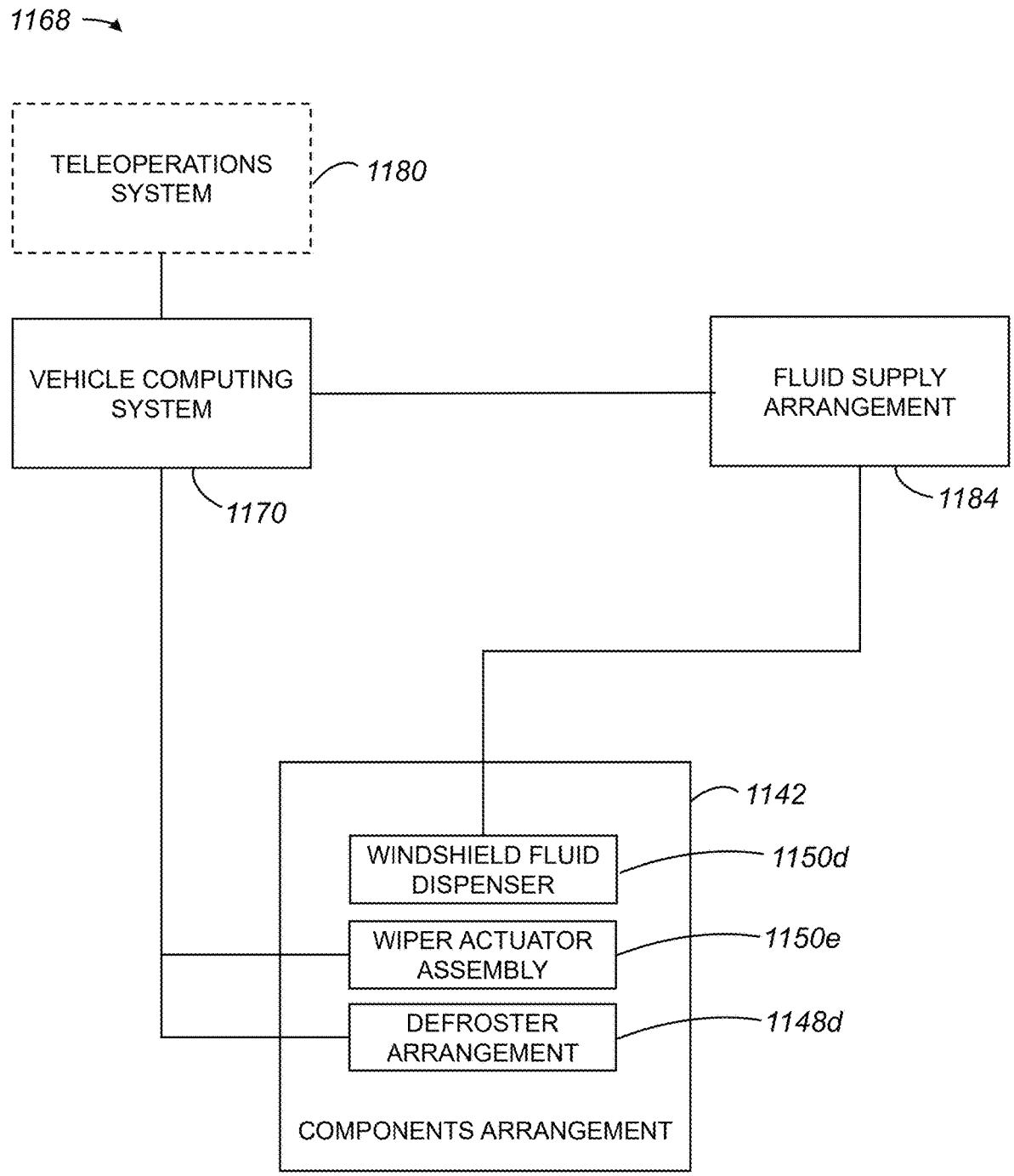
FIG. 11 is a block diagram representation of a second architecture which includes a components arrangement in accordance with an embodiment.

FIG. 11 is a block diagram representation of a second architecture which includes a components arrangement in accordance with an embodiment. A second architecture 1168 includes a vehicle computing system 1170, a fluid supply arrangement 1184, and a components arrangement 1142. Vehicle computing system 1170 is configured to provide commands or instructions to components arrangement 1142 to activate, as well as to deactivate, a wiper actuator assembly 1150e and a defroster arrangement 1148d. Vehicle computing system 1170 may also provide commands or instructions to fluid supply arrangement 1184. Vehicle computing system 1170 includes drive circuits configured to send commands to fluid supply arrangement 1184, wiper actuator assembly 1150e, and defroster arrangement 1148d.

Fluid supply arrangement 1184 may include a washer pump and a reservoir that contains a cleaning fluid. Vehicle computing system 1170 may effectively control the activation and deactivation of the washer pump that controls the flow of fluid from the reservoir. Fluid supply arrangement 1184 may control a windshield fluid dispenser 1150d. Windshield fluid dispenser 1150d may be a nozzle.

Vehicle computing system 1170 may, in one embodiment, obtain commands from an optional teleoperations system 1180. That is, commands or instructions to components arrangement 1142 may be obtained from an operator through optional teleoperations system 1180, rather than from an autonomy system. Optional teleoperations system 1180 may cause vehicle computing system 1170 to send activation and/or deactivation commands to fluid supply arrangement 1184 and components arrangement 1142.

Figure 12:
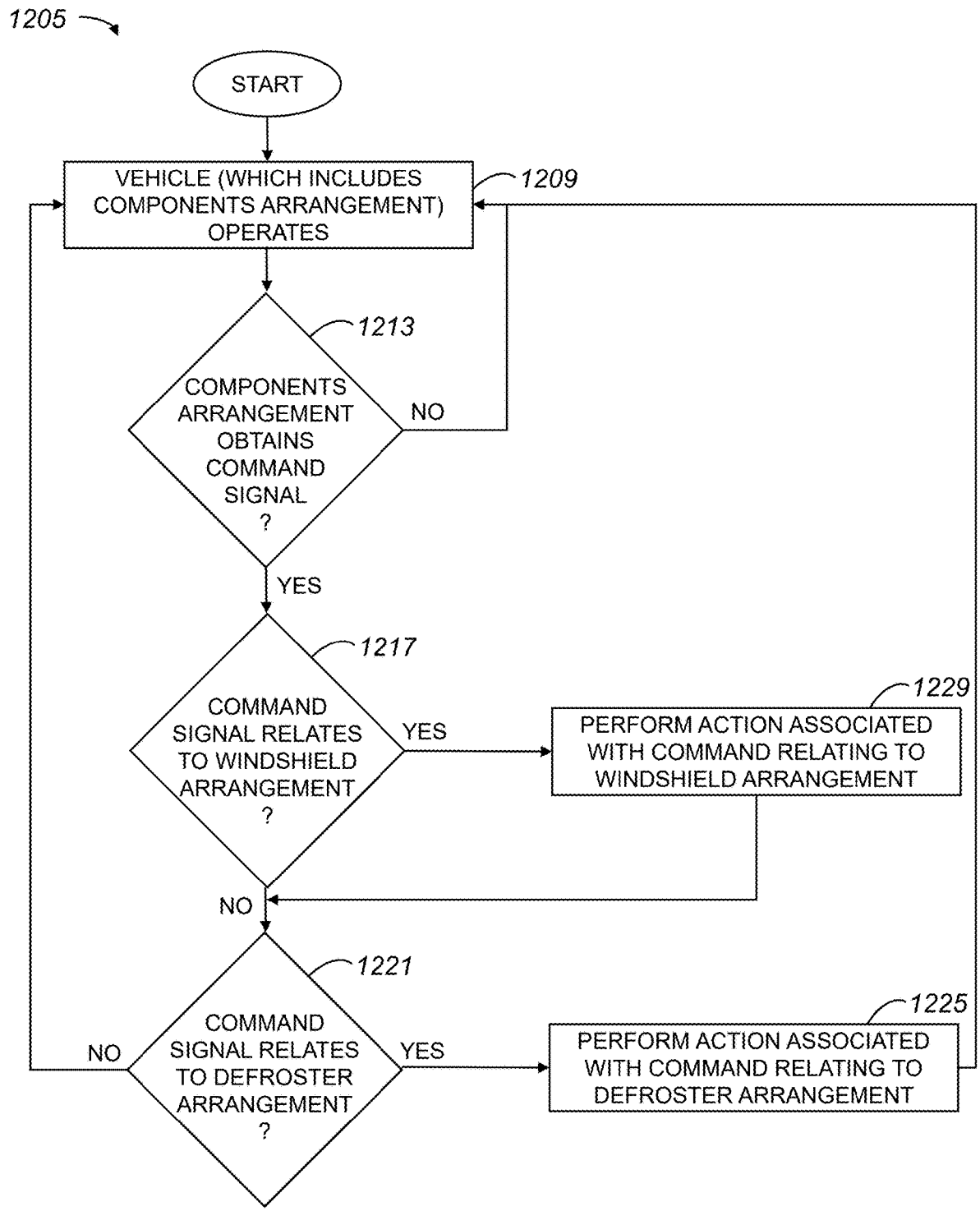
FIG. 12 is a process flow diagram which illustrates a method of utilizing a components arrangement during the operation of a vehicle in accordance with an embodiment.

Referring next to FIG. 12, a method of utilizing a components arrangement during the operation of an autonomous vehicle will be described in accordance with an embodiment. A method 1205 of utilizing a components arrangement during the operation of an autonomous vehicle begins at a step 1209 in which a vehicle that includes a components arrangement operates. The vehicle may operate autonomously and/or under the control of a remote operator such as a teleoperator.

In a step 1213, a determination is made as to whether the components arrangement obtains a command signal. A command signal may be obtained from an autonomy system of the vehicle, or from a remote operator. If the determination is that the components arrangement has not obtained a command signal, process flow returns to step 1209 in which the vehicle continues to operate.

Alternatively, if the determination in step 1213 is that the components arrangement has obtained a command signal, it is determined in step 1217 whether the obtained command signal relates to a windshield arrangement of the components arrangement. That is, it is determined whether the obtained command signal is configured to activate or deactivate a wiper actuator and/or a fluid dispenser.

If the determination in step 1217 is that the command signal does not relate to windshield arrangement, then process flow proceeds to a step 1221 in which it is determined whether the command signal relates to a defroster arrangement included in the components arrangement. In the described embodiment, of the command signal does not relate to the defroster arrangement, then process flow returns to step 1209 in which the vehicle continues to operate.

On the other hand, if it is determined in step 1221 that the command signal relates to the defroster arrangement, then in a step 1225, the action associated with the command relating to the defroster arrangement is performed. The action may generally involve either activating the defroster arrangement or deactivating the defroster arrangement. Once the command relating to the defroster arrangement is performed, process flow returns to step 1209 in which the vehicle continues to operate.

Returning to step 1217 and the determination of whether the command signal relates to the windshield arrangement, if it is determined that the command relates to the windshield arrangement, the indication is that a wiper actuator may be activated or deactivated, and/or that a fluid dispenser may be activated or deactivated. As such, in a step 1229, the action associated with the command relating to the windshield arrangement is performed. After the command relating to the windshield arrangement is performed, it is determined whether the command signal also relates to the defroster arrangement in step 1221.

Figure 13:
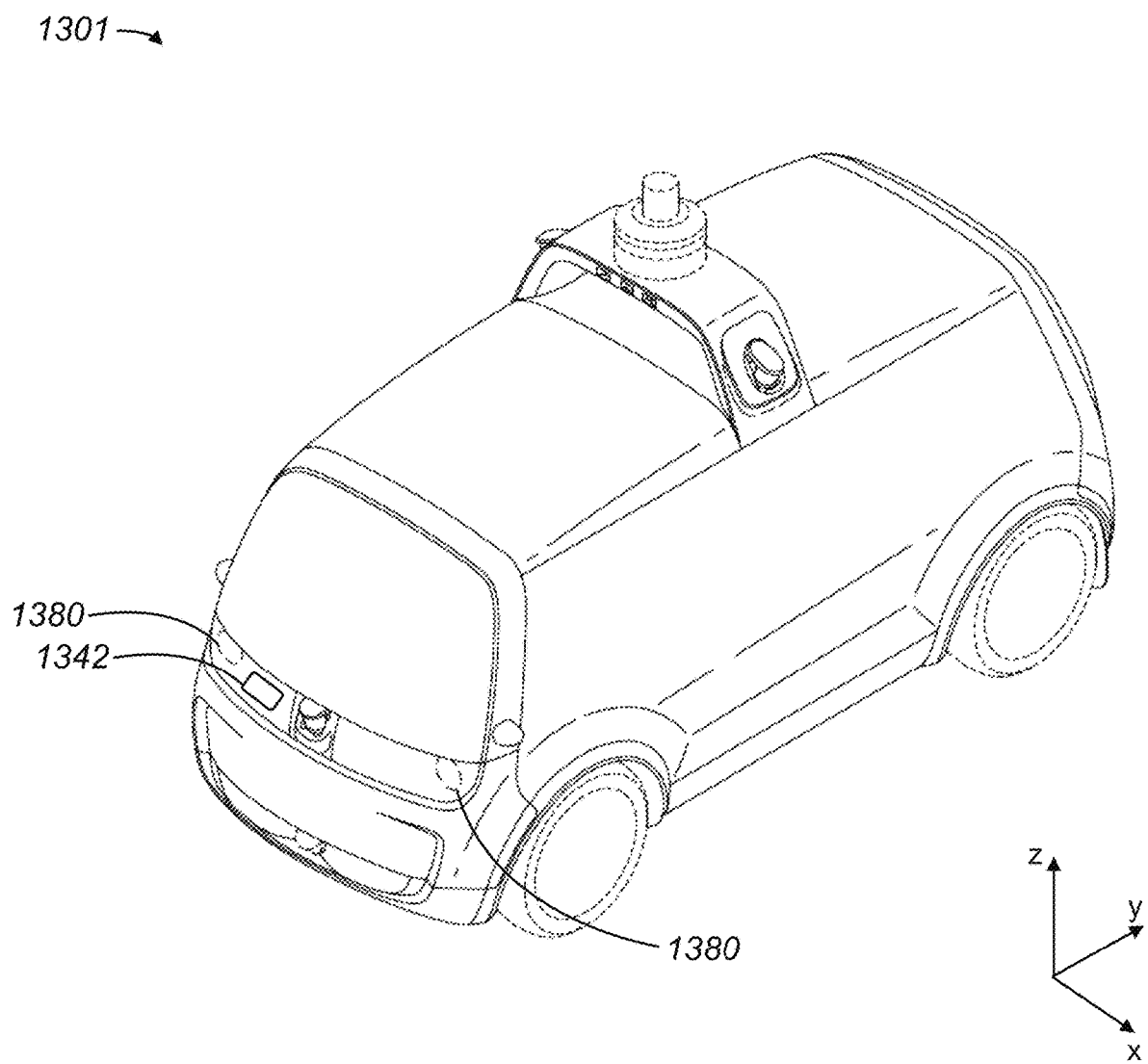
FIG. 13 is a diagrammatic representation of a vehicle with a components arrangement positioned at a front surface of a body of the vehicle in accordance with an embodiment.

In one embodiment, a components arrangement may be positioned on a front surface of a body of a vehicle such that a wiper and a fluid dispenser or valve arrangement is effectively exposed to an exterior of the vehicle. That is, a wiper and a fluid dispenser that are part of a components arrangement may be exposed on, or as part of, an exterior surface of a vehicle. With reference to FIG. 13, a vehicle with a components arrangement positioned at a front surface of a body of the vehicle will be described in accordance with an embodiment. A vehicle 1301 is configured to carry a components arrangement 1342 that is positioned on a front surface or as part of a front panel of vehicle 1301. The front panel may be supported on a chassis of vehicle 1301 such that an exterior surface of the front panel is substantially flush with the front surface of vehicle 1301. As shown, components arrangement 1342 is positioned substantially between headlights 1380 relative to an x-direction and a z-direction. Components arrangement 1342 may be arranged such that at least one component or surface associated with components arrangement 1342 is exposed. For example, a wiper and/or a fluid dispenser (not shown) of components arrangement 1342 may be exposed.

Figure 14:
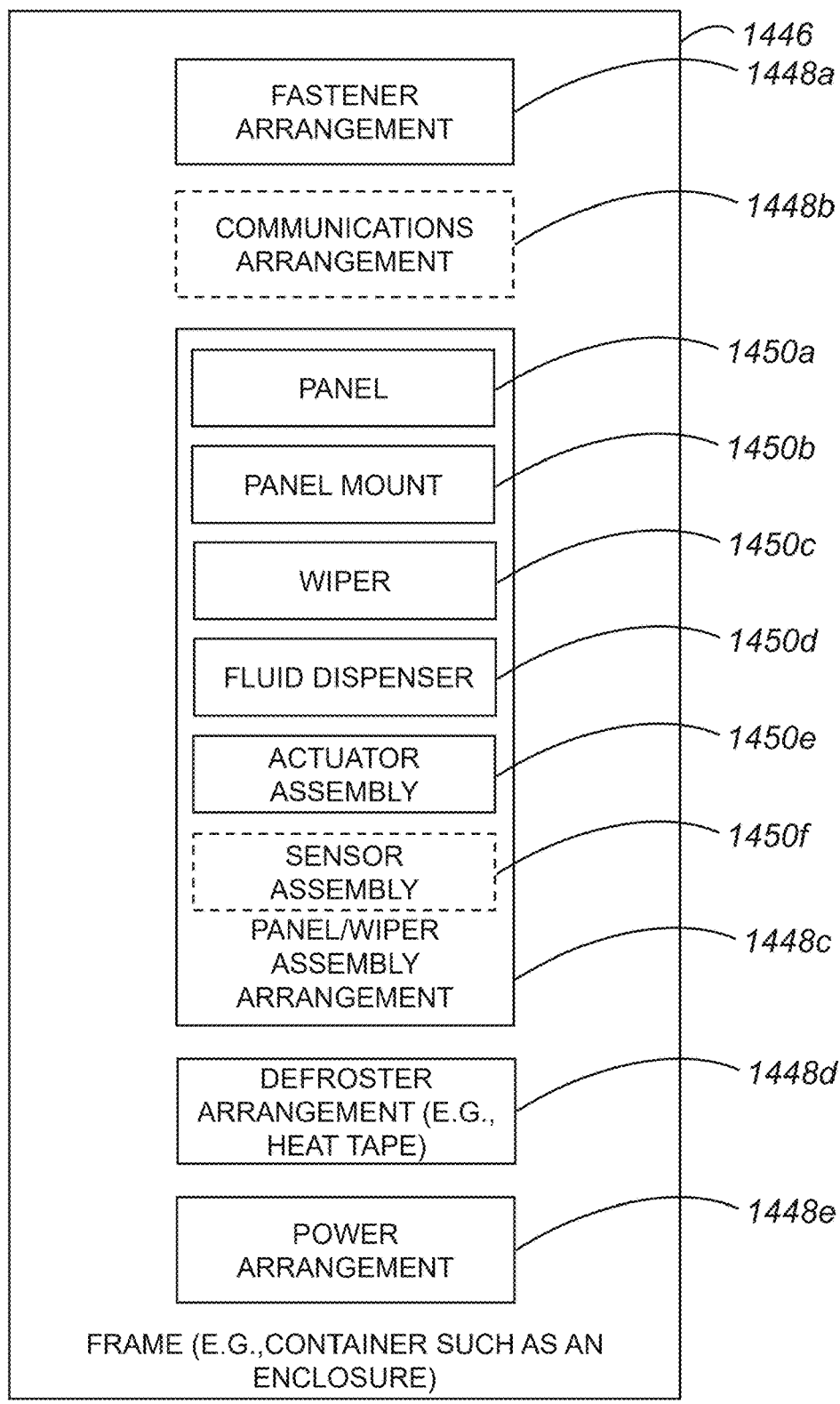
FIG. 14 is a block diagram representation of a components arrangement, e.g., components arrangement 1342 of FIG. 13, in accordance with an embodiment.

Components arrangement 1342 may generally include a panel that may be cleaned and/or cleared using a wiper arrangement and fluid from a fluid dispenser. The panel may be a windshield, or may be any structure with a surface which may be cleaned and/or cleared using a wiper arrangement and fluid from a fluid dispenser. That is, the panel includes a surface onto which fluid may be dispensed by a fluid dispenser and on which a wiper of a wiper arrangement may sweep. Referring next to FIG. 14, one embodiment of components arrangement 1342 will be described. Components arrangement 1342 includes a frame 1446 which supports a fastener arrangement 1448*a*, an optional communications arrangement 1448*b*, a panel/wiper assembly arrangement 1448*c*, a defroster arrangement 1448*d*, and a power arrangement 1448*e*.

Frame 1446 may be formed in any suitable shape, and from any suitable material, which enables frame 1446 to provide a structure that supports, e.g., at least partially contains, fastener arrangement 448*a*, optional communications arrangement 1448*b*, panel/wiper assembly arrangement 1448*c*, defroster arrangement 1448*d*, and power arrangement 1448*e*. Frame 1446 may be such that at least part of panel/wiper assembly arrangement 1448*c* is effectively exposed, or otherwise not contained within frame 1446.

Fastener arrangement 1448*a* may include one or more physical mechanisms such as connectors that are arranged to enable components arrangement 1342 to be secured to vehicle 1301 of FIG. 13. By way of example, fastener arrangement 1448*a* may be configured to enable components arrangement 1342 to be positioned within or on a front panel of vehicle 1301 of FIG. 13. Fastener arrangement 1448*a* may be configured to interface with vehicle 1301 of FIG. 13 to substantially couple components arrangement 1342 to vehicle 1301. It should be appreciated that vehicle 1301 of FIG. 13 may include an interface, e.g., a connector or other fastener, that engages fastener arrangement 1448*a*.

Optional communications arrangement 1448*b* is configured to enable information to be obtained by components arrangement 1342, and to enable components arrangement 1342 to provide data. For example, communications arrangement 1448*b* may obtain information from other systems of vehicle 1301 of FIG. 13, and may process the obtained information. Processing the obtained information may include, but is not limited to including, determining when to activate a function associated with effectively controlling panel/wiper assembly arrangement 1448*c* and/or defroster arrangement 1448*d*.

Panel/wiper assembly arrangement 1448*c* generally includes a panel 1450*a*, a panel mount 1450*b*, at least one wiper 1450*c*, a fluid dispenser 1450*d*, an actuator assembly 1450*e*, and an optional sensor assembly 1450*f*. Panel 1450*a* may be formed from any suitable material that may be cleaned or cleared using fluid dispensed by fluid dispenser 1450*d* and wiper 1450*c*. For example, panel 1450*a* may be a sheet of glass or plastic. The width, height, length, thickness, and curvature of panel 1450*a* may vary. The overall shape of panel 1450*a* may also vary. It should be appreciated that panel 1450*a* may be opaque, but is not limited to being opaque. Panel mount 1450*b* is configured to support or to otherwise support panel 1450*a* in a desired position with respect to frame 1446. Wiper 1450*c* includes one or more wiper blades which are arranged to sweep over a surface of panel 1450*a* to clear and/or clean panel 1450*a*. Wiper 1450*c* may be configured to sweep over the surface of panel 1450*a* at two different speeds. Fluid dispenser 1450*d* generally includes a reservoir configured to hold a cleaning fluid such as water, a pump, and a dispensing system such as a nozzle or a sprinkler configured to dispense the cleaning fluid substantially onto a surface of panel 1450*a*. Actuator assembly 1450*e* is arranged to cause wiper 1450*c* to move over a surface of panel 1450*a* and, in one embodiment, may effectively activate a pump in fluid dispenser 1450*d* to draw fluid out of a reservoir and to dispense the fluid using a nozzle or a sprinkler. Actuator assembly 1450*e* may include a motor which is configured to operate to enable wiper 1450*c* to sweep across the surface of panel 1450*a* in more than one direction. Optional sensor assembly 1450*f* may include a rain and/or light sensor that may be used to effectively trigger actuator assembly 1450*e* such that wiper 1450*c* may sweep across the surface of panel 1450*a*.

Defroster or defogger arrangement 1448*d* may be disposed on or in a vicinity of panel 1450*a* such that defroster arrangement 1448*d* may provide heat to a surface of panel 1450*a*. In one embodiment, defroster arrangement 1448 may include heat tape.

Power arrangement 1448*e* may be configured to provide power to components arrangement 1342. For example, power arrangement 1448*e* may include a battery that substantially powers panel/wiper assembly arrangement 1448*c* and defroster arrangement 1448*d*. Alternatively, power arrangement 448*e* may instead be an interface which is configured to draw or to otherwise obtain power, e.g., electrical power, from vehicle 1301 of FIG. 13.

In general, the size of components arrangement 1342, and components within components arrangement 1342, may vary widely. For example, components arrangement 1342 may be arranged within a structure that is approximately 250 millimeters in height by 250 millimeters in width by 250 millimeters in length, although it should be appreciated that the size may vary.

Figure 15:
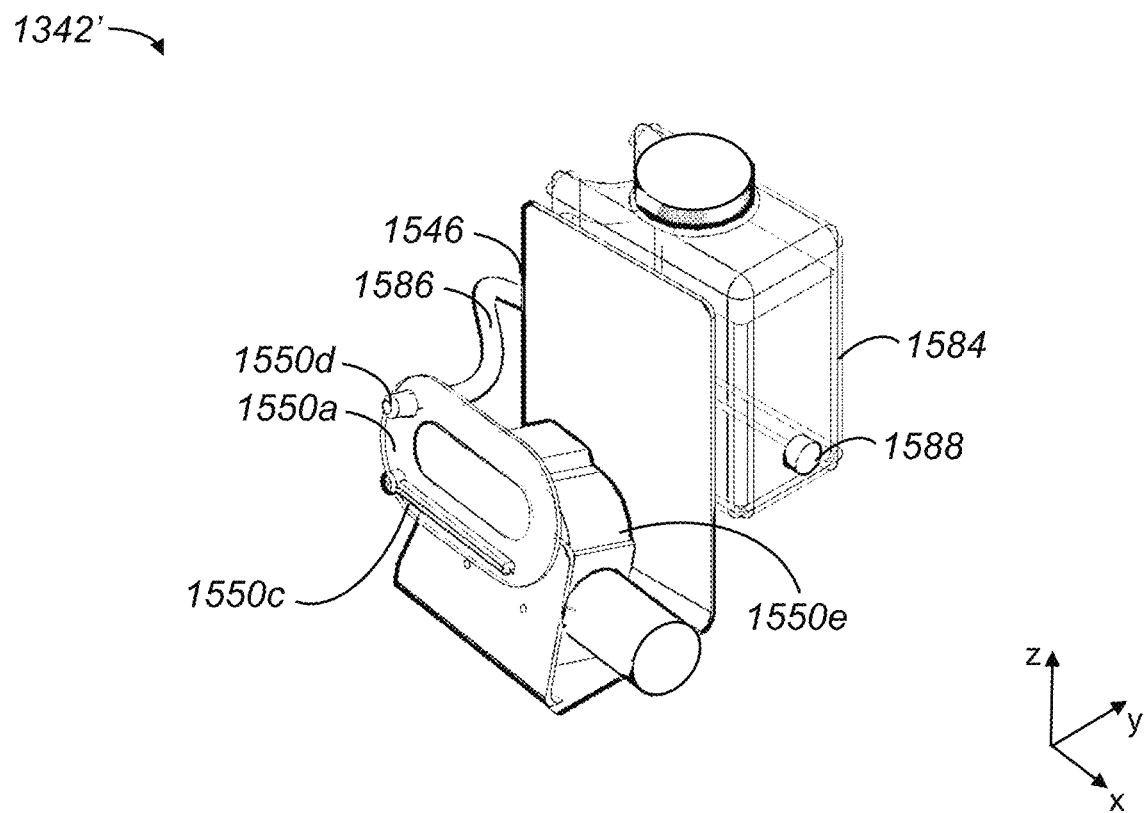
FIG. 15 is a diagrammatic representation of a components arrangement e.g., components arrangement 1342 of FIGS. 13 and 14, in accordance with an embodiment.

FIG. 15 is a diagrammatic representation of a components arrangement e.g., components arrangement 1342 of FIGS. 13 and 14, in accordance with an embodiment. Components arrangement 1342' includes at least a panel 1450*a* with a surface onto which a fluid dispenser 1450*d* is arranged to dispense fluid such that the dispensed fluid may effectively be swept off the surface by a wiper 1550*c*. Wiper 1450*c* may generally be controlled by an actuator assembly 1450*e* which enables wiper 1450*c* to sweep, or otherwise move, across the surface of panel 1450*a*. In the embodiment as shown, components arrangement 1342' includes, or is otherwise coupled to, a fluid reservoir 1584 which contains a fluid that is provided to fluid dispenser 1450*d*. Fluid may be transferred from fluid reservoir 1584 to fluid dispenser 1450*d* through a hose arrangement 1586. That is, hose arrangement 1586 may facilitate the flow of fluid from fluid reservoir 1584 to fluid dispenser 1450*d*.

Fluid reservoir 1584 may be configured as any suitable container, e.g., a bottle. A level sensor 1588 may be included in fluid reservoir 1584 to effectively sense a level of, or an amount of, fluid in fluid reservoir 1584. Level sensor 1588 may provide information relating to the fluid level within fluid reservoir 1584 to a controller such as a vehicle controller such that systems on a vehicle that includes components arrangement 1342' may essentially track the fluid level.

Components arrangement 1342' includes a frame 1546 configured to support at least panel 1450*a*, fluid dispenser 1450*d*, wiper 1450*c*, and actuator assembly 1450*e*. Frame 1546 generally supports other components included in components arrangement 1342' which have not been shown for ease of illustration.

Figure 16:
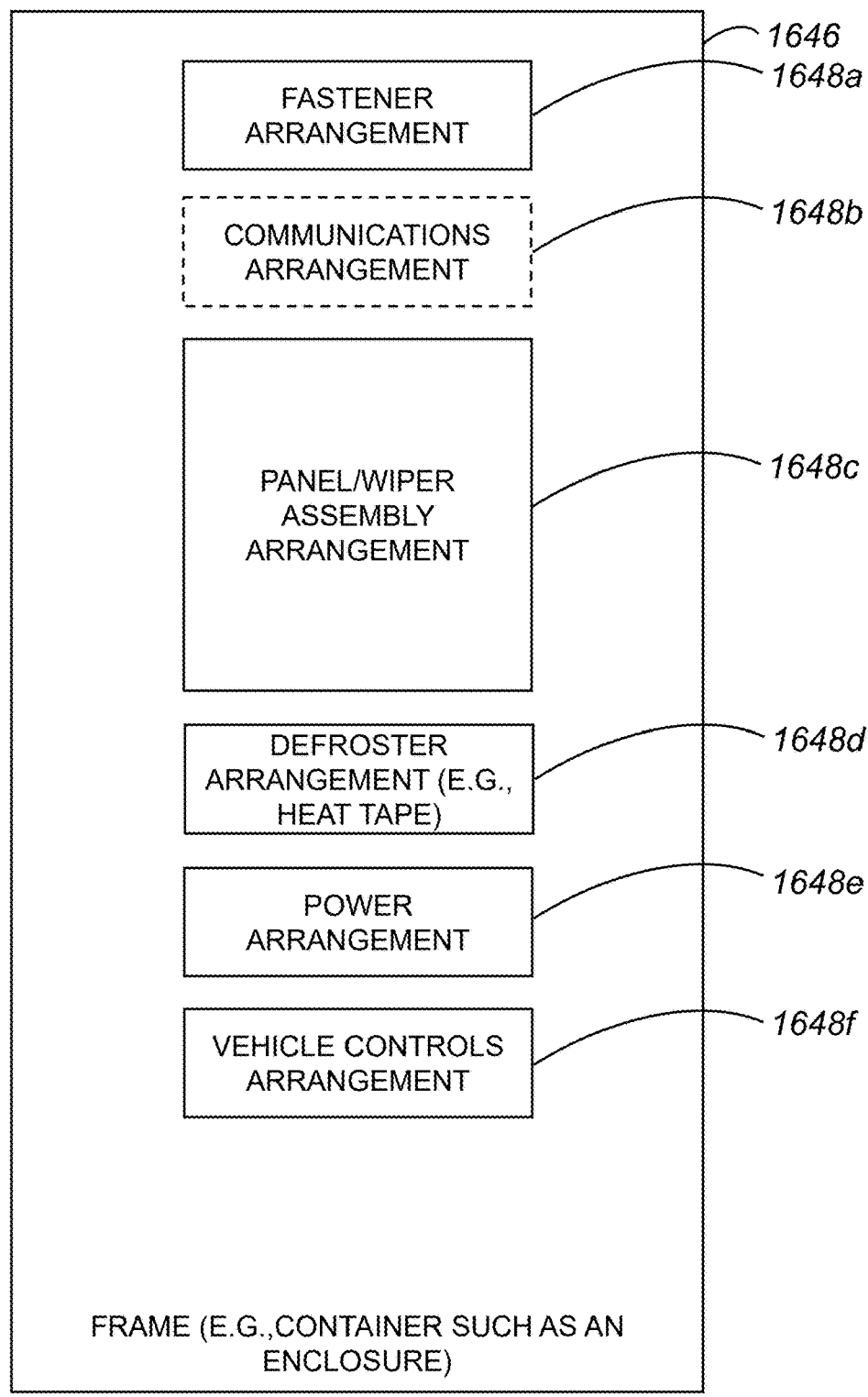
FIG. 16 is a block diagram representation of a components arrangement which includes a vehicle controls arrangement in accordance with an embodiment.

A components arrangement included on a vehicle is not limited to including components such as a panel, a windshield, and/or a wiper arrangement. For example, a components arrangement may include components which enable a vehicle to be controlled. FIG. 16 is a block diagram representation of a components arrangement which includes a vehicle controls arrangement in accordance with an embodiment. A components arrangement 1642 includes a fastener arrangement 1648*a*, an optional communications arrangement 1648*b*, a panel/wiper assembly arrangement 1648*c*, a defroster arrangement 1648*d*, a power arrangement 1648*e*, and a vehicle controls arrangement 1648*f*. Fastener arrangement 1648*a*, optional communications arrangement 1648*b*, panel/wiper assembly arrangement 1648*c*, defroster arrangement 1648*d*, and power arrangement 1648*e* are similar to fastener arrangement 1448*a*, optional communications arrangement 1448*b*, panel/wiper assembly arrangement 1448*c*, defroster arrangement 1448*d*, and power arrangement 1448*e*, respectively, as discussed above with respect to FIG. 14.

Vehicle controls arrangement 1648*f* may generally include hardware and/or software which enables components arrangement 1642 to be used to operate a vehicle (not shown) on which components arrangement 1642 is carried. The hardware and/or software may be configured to enable the vehicle (not shown) to be steered, to accelerate, to decelerate, and/or to stop. In one embodiment, vehicle controls arrangement 1648*f* may obtain instructions from a compute system on a vehicle (not shown), and may cause vehicle to travel or to otherwise operate. In another embodiment, vehicle controls arrangement 1648*f* may obtain instructions from a source external to a vehicle (not shown), and may cause vehicle to travel or to otherwise operate.

Figure 17:
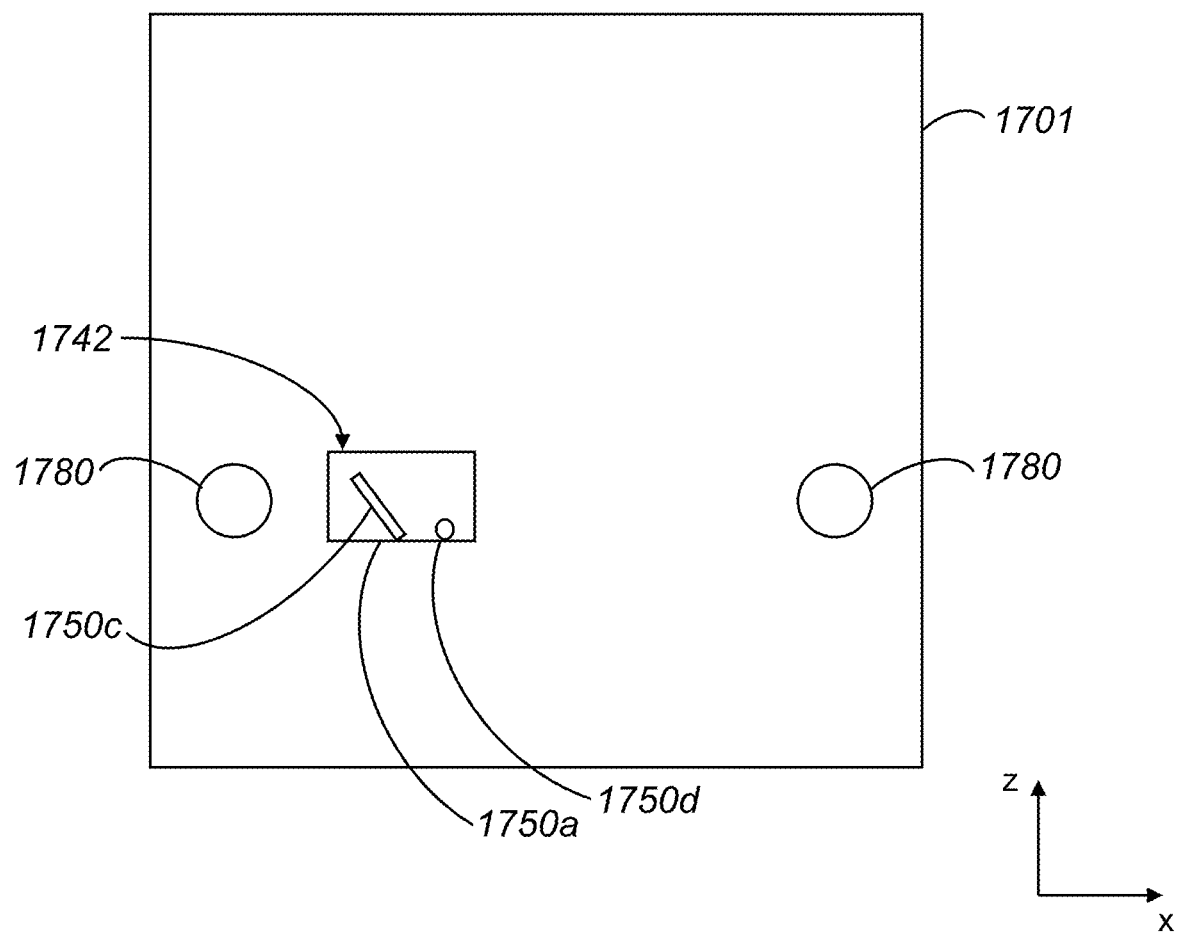
FIG. 17 is a diagrammatic representation of a front of a vehicle that includes a components arrangement in a first orientation in accordance with an embodiment.

As shown in FIG. 13, a components arrangement may be positioned at a front of a vehicle. The location of a components arrangement substantially on a front of the vehicle may vary. FIG. 17 is a diagrammatic representation of a front of a vehicle that includes a components arrangement in a first orientation in accordance with an embodiment. A front surface or panel of vehicle 1701 includes headlights 1780 and a components arrangement 1742. It should be appreciated that other components, e.g., sensors such as lidars, which may be substantially included on a front surface of vehicle 1701, have not been shown for ease of illustration. Components arrangement 1742 may be located substantially between headlights 1780 relative to an x-axis and a z-axis.

Components arrangement 1742 includes at least one wiper 1750*c* and aa fluid dispenser 1750*d* that is arranged dispense a fluid onto a surface of components arrangement 1742 that may be used by wiper 1750*c* to clean and/or clear the surface. Wiper 1750*c* and fluid dispenser 1750*d* may be disposed such that wiper 1750*c* and fluid dispenser 1750*d* are effectively exposed on the front of vehicle 1701. It should be appreciated that fluid dispenser 1750*d*, although shown near a bottom of components arrangement 1742 relative to the z-axis, may be located substantially anywhere with respect to components arrangement 1742.

Figure 18:
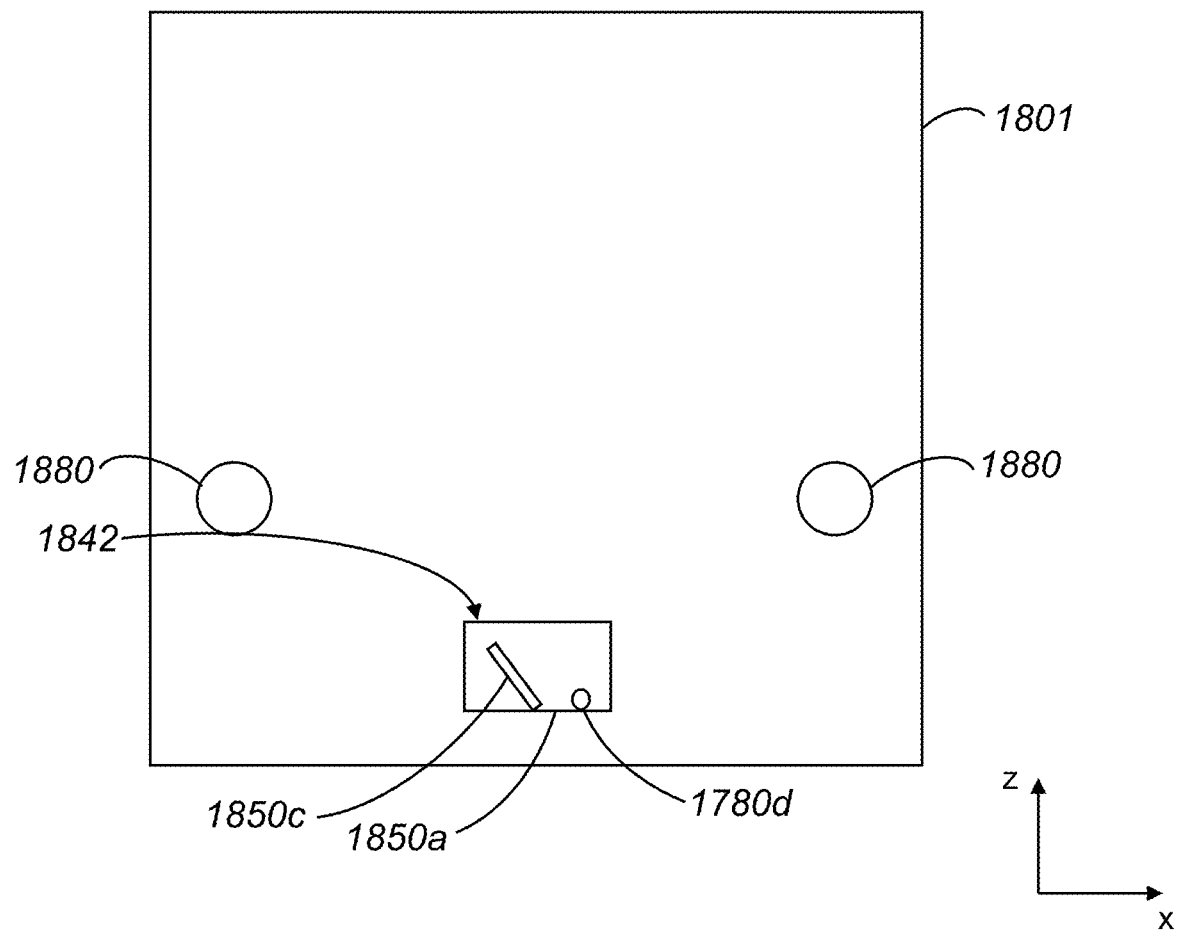
FIG. 18 is a diagrammatic representation of a front of a vehicle that includes a components arrangement in a second orientation in accordance with an embodiment.

FIG. 18 is a diagrammatic representation of a front of a vehicle that includes a components arrangement in a second orientation in accordance with an embodiment. A front surface or panel of vehicle 1801 includes headlights 1880 and a components arrangement 1842. Components arrangement 1842 may be positioned substantially between headlights 1880 relative to an x-axis, but may effectively be offset from headlights 1880 relative to a z-axis. In one embodiment, components arrangement 1842 may be located substantially on the front surface of vehicle 1801 at a position at which a license plate may typically be located. For example, components arrangement 1842 may be configured to effectively enable a license plate to overlay components arrangement 1842. A wiper 1850*c* and a fluid dispenser 1850*d* of components arrangement 1842 may be disposed such that wiper 1850*c* and fluid dispenser 1850*d* are effectively exposed on the front of vehicle 1801, e.g., when a license plate is not overlayed over components arrangement 1842. A front surface, or surface over which wiper 1850*c* may sweep and onto which fluid dispenser 1850*d* may dispense a fluid, may be coupled to the front of vehicle 1801, e.g., to a front panel or a vehicle panel that forms a front of vehicle 1801.

As previously mentioned, a components arrangement may contain components which may be identified as being substantially needed in order for a vehicle such as an autonomous vehicle to be deployed, but generally do not enhance the ability for the vehicle to operate safely. Some vehicles may be expected to effectively meet predetermined requirements, even if the predetermined requirements do not affect the operational safety of a particular vehicle. For example, a vehicle may generally be expected to include at least one wiper and a fluid dispenser in order to be deployed, but for an occupantless vehicle, the inclusion of a wiper and a fluid dispenser intended to clean and/or clear a windshield to provide occupants with visibility generally does not have an effect on the ability of the vehicle to operate safely. As such, a wiper and a fluid dispenser may be included in a components arrangement that is onboard a vehicle which otherwise may not be configured with a wiper and a fluid dispenser.

A vehicle that does not include one or more particular components, e.g., components which may not be considered to be critical for the safe operation of the vehicle, may be configured to accept a components arrangement that includes the one or more particular components. Once the components arrangement is installed or otherwise integrated with the vehicle, the vehicle may then be considered to be updated. That is, the installation of a components arrangement into a first version of a vehicle may effectively create a second version of the vehicle.

Figure 19:
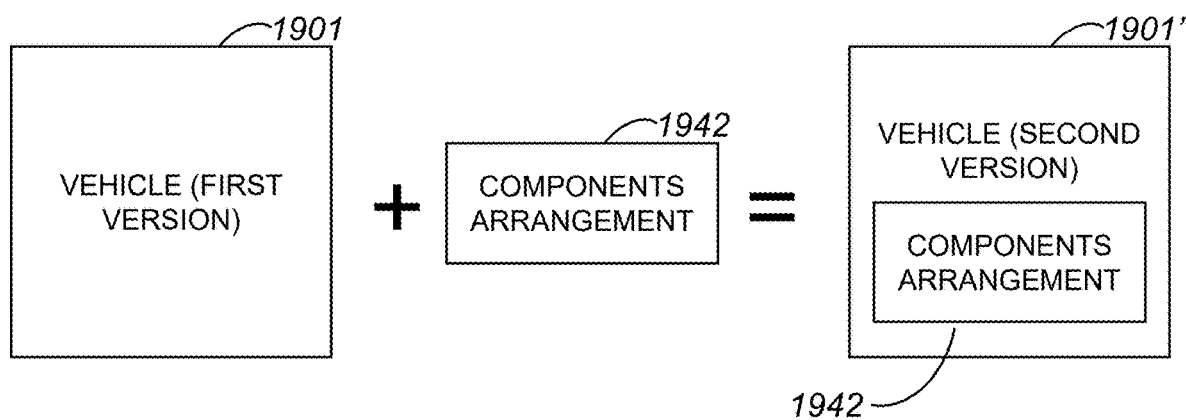
FIG. 19 is a diagrammatic representation of a method of effectively creating a new version of a vehicle by incorporating a components arrangement in accordance with an embodiment.

FIG. 19 is a diagrammatic representation of a method of effectively creating a new version of a vehicle by incorporating a components arrangement in accordance with an embodiment. A vehicle 1901, which may be a first version, may be provided with a components arrangement 1942 that includes one or more components, e.g., hardware and/or software components, which vehicle 1901 does not already include. In one embodiment, components arrangement 1942 may include components similar to those described above, as for example with respect to FIGS. 4, 14, and 16. However, it should be appreciated that components arrangement 1942 may instead include, or additionally include, other components which may be needed to enable vehicle 1901 to meet a set of specifications, e.g., deployment requirements. In one embodiment, the inclusion of components included in components arrangement 1942 does not have a significant effect on the safe operation of vehicle 1901. In such an embodiment, the components included in components arrangement 1942 may increase the likelihood of the safe operation of some vehicles, but does not have a significant affect on the safe operation of vehicle 1901.

When components arrangement 1942 is assembled or integrated into vehicle 1901, a second version of vehicle 1901' is effectively formed. Vehicle 1901' includes components arrangement 1942 and, as such, effectively includes the functionality and capabilities associated with components in components arrangement 1942.

Figure 20:
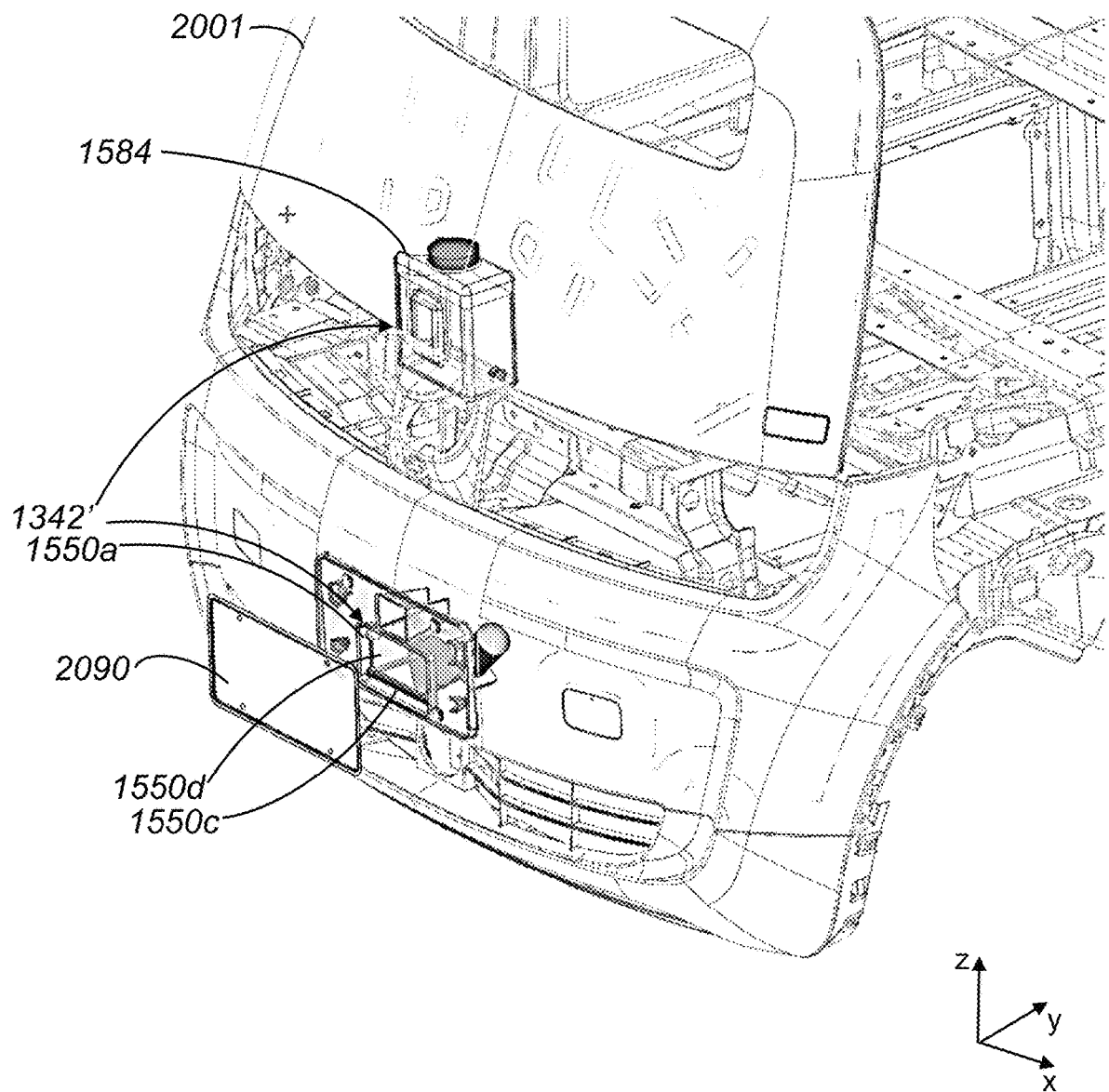
FIG. 20 is a diagrammatic representation of a front of an autonomous vehicle with a components arrangement, e.g., components arrangement 1342' of FIG. 15, onboard in accordance with an embodiment.

When a components arrangement that is situated on a vehicle includes a fluid reservoir, the fluid reservoir may be positioned substantially anywhere in the vehicle, and may use hoses, tubes, and/or the like to supply a fluid dispenser arrangement such as a nozzle with fluid to dispense onto a surface such that the surface may be cleared or cleaned by a wipe. FIG. 20 is a diagrammatic representation of a front of an autonomous vehicle with a components arrangement, e.g., components arrangement 1342' of FIG. 15, onboard in accordance with an embodiment. An autonomous vehicle 2001 includes components arrangement 1342'. Components arrangement 1342' is arranged such that panel 1550*a*, wiper 1550*c*, and fluid dispenser 1550*d* are situated behind a plate 2090 which is shown in an exploded view. When vehicle 2001 is in use, e.g., driving, plate 2090 may be positioned substantially on a front of vehicle 2001 such that panel 1550*a* is behind plate 2090.

Fluid reservoir 1584 is arranged to provide fluid to fluid dispenser 1550*d* such that fluid dispenser 1550*d* may cause fluid to be sprayed onto, or otherwise flowed onto, panel 1550*a*. In one embodiment, fluid dispenser 1550*d* may be positioned near a top of panel 1550*a* relative to a z-axis such that fluid dispensed by fluid dispenser 1550*d* may flow down panel 1550*a*. Fluid reservoir 1584, as shown, is positioned substantially above fluid dispenser 1550*d* such that gravity forces may facilitate the transfer of fluid from fluid reservoir 1584 to fluid dispenser 1550*d*. It should be appreciated, however, that fluid reservoir 1584 may generally be provided substantially anywhere in or on vehicle 2001.

Although only a few embodiments have been described in this disclosure, it should be understood that the disclosure may be embodied in many other specific forms without departing from the spirit or the scope of the present disclosure. By way of example, the components included in a components arrangement may vary widely. That is, the contents of a components arrangement are not limited to the components discussed above. The contents of components arrangement used in a vehicle may generally be selected to substantially enable the vehicle to comply with rules and meet regulations including, but not limited to including, Federal Motor Vehicle Safety Standard (FMVSS) requirements, FMVSS requirements that are applicable to a particular vehicle which may be addressed by a components arrangement may include, but are not limited to including, FMVSS 103 and/or FMVSS 104. In one embodiment, other FMVSS requirements which may not be applicable to a particular vehicle, e.g., FMVSS 205, may be addressed by a components arrangement. Other requirements or standards which components arrangement may comply with include, but are not limited to including, Society of Automotive Engineers (SAE) standards such as SAE J902, SAE J903a and SAE J942.

A components arrangement may vary, in one embodiment, such that a wiper arrangement, a defrosting arrangement, and a fluid dispensing arrangement such as a nozzle are located in one arrangement, while other components may be located in other places in a vehicle. In other words, aside from a wiper arrangement, a defrosting arrangement, and/or a fluid dispenser, other components in a components arrangement are generally not limited to being located in the same physical structure as the wiper arrangement, defrosting arrangement, and fluid dispenser.

In one embodiment, an autonomous vehicle may be configured to operate under the control of a remote operator such as a teleoperator using a teleoperations system. As will be appreciated by those skilled in the art, a teleoperations system may generally enable a driver to remotely control, and hence, drive a vehicle using a system which obtains information from the vehicle and provides instructions to the vehicle. A teleoperations system may generally include, but is not limited to including, a communications system for exchanging information with a vehicle, a steering wheel, an accelerator pedal, a brake pedal, vehicle controls such as turn signals, and/or a display which enables an environment around the vehicle to be viewed.

The components in a components arrangement of a vehicle may be configured to be substantially automatically activated, e.g., based on signals obtained from a compute system or other system onboard the vehicle. Alternatively, or additionally, the components in a components arrangement may be configured to be controlled or activated by a teleoperator using a teleoperations system or by a remote operator using a remote control.

When an autonomous vehicle is configured to operate under the control of a teleoperator using a teleoperations system, the teleoperator may control components or systems contained within a components arrangement. In other words, components within a components arrangement may be controlled, e.g., activated and/or deactivated, remotely by a teleoperator.

The size of an enclosure or a frame for a components arrangement which contains components may vary widely. The shape of the enclosure may also vary widely. For example, while an enclosure may generally be box-like, the enclosure may have any shape which is suitable for accommodating contents contained therein. In addition, the size of the components within the enclosure may also vary widely. A components arrangement that is supported by a frame structure may be configured to enable portions of the components arrangement to be effectively exposed and not contained within the frame structure, e.g., such that a wiper and a fluid dispenser are supported by the frame structure but are accessible and not enclosed by the frame structure. Such a frame structure may vary in shape, size, and configuration.

While one components arrangement has been described as being included on a vehicle, it should be understood that the number of components arrangements included on a vehicle may vary widely. In one embodiment, separate components arrangements may be associated with different functions. For instance, a vehicle may include a first components arrangement that includes a windshield arrangement and a second components arrangement that includes a camera.

A wiper arrangement has generally been described as including at least one wiper and an actuator that is configured to cause the wiper to sweep over a surface, e.g., a surface of a panel or a surface of a windshield, associated with a components arrangement. Sweeping over a surface may generally include causing a blade of a wiper to contact the surface as the wiper moves, e.g., rotates or pivots. When the wiper moves over a surface such that a part of the wiper is in physical contact with the surface, the wiper may remove fluid or debris from the surface.

An actuator, e.g., wiper motor, that is part of a wiper arrangement included in a components arrangement may be configured to have at least two different frequencies or speeds of operation. Generally, a substantially highest frequency or speed may differ from a substantially lowest frequency or speed by at least approximately fifteen cycles per minute, with the substantially lowest frequency or speed being at least approximately twenty cycles per minute. In one embodiment, one speed may be approximately forty-five cycles per minute.

A defroster arrangement such as a heat tape may generally defrost and/or defog a surface of a panel, e.g., windshield, of a components arrangement. The defroster arrangement may be configured to defrost and/or defog the surface of the panel within a predetermined amount of time, as for example within approximately thirty minutes. It should be appreciated that a defroster arrangement is not limited to being a heat tape. By way of example, a defroster arrangement may be a resistor, or the defroster arrangement may utilize heat from a radiator or heating, ventilation, and air conditioning (HVAC) system included in a vehicle.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A vehicle comprising:
a chassis;
a propulsion system carried on the chassis, the propulsion system configured to propel the vehicle;
a control system carried on the chassis, the control system configured to enable the vehicle to operate autonomously; and
a components arrangement, the components arrangement carried on the chassis, wherein the components arrangement is an assembly that includes at least a frame, a panel having a surface, a wiper arrangement having at least one wiper, and a fluid distribution arrangement, the frame configured to interface with the chassis and to support the panel, the wiper arrangement, and the fluid distribution arrangement, the wiper arrangement being partially contained in the frame, wherein the fluid distribution arrangement is configured to dispense a fluid onto the surface and the wiper is configured to sweep over the surface, and wherein the assembly is removably carried on the chassis.

2. The vehicle of claim 1 further including a first vehicle panel and an interface, the first vehicle panel being carried on the chassis and forming a front surface of the vehicle, wherein the components arrangement includes a fastener arrangement, the components arrangement being coupled to the first vehicle panel interface using a fastener arrangement.

3. The vehicle of claim 2 wherein the front surface forms an exterior surface of the vehicle, and wherein the panel is flush with the exterior surface of the vehicle.

4. The vehicle of claim 1 wherein the control system is further arranged to control the wiper arrangement and to control the fluid dispenser.

5. The vehicle of claim 1 wherein the components arrangement further includes a communications arrangement, the communications arrangement configured to enable the wiper arrangement and the fluid dispenser to be controlled.

6. The vehicle of claim 1 wherein the panel is formed from one selected from the group including glass and plastic.

7. The vehicle of claim 1 wherein the components arrangement further includes a defroster arrangement, the defroster arrangement being coupled to the panel.

8. The vehicle of claim 7 wherein the defroster arrangement includes a heat tape.

9. A vehicle comprising:
a chassis;
a propulsion system carried on the chassis, the propulsion system configured to propel the vehicle;
a control system carried on the chassis, the control system configured to enable the vehicle to operate autonomously; and
a components arrangement, the components arrangement carried on the chassis, wherein the components arrangement includes an enclosure, a panel having a surface, a wiper arrangement having at least one wiper, and a fluid distribution arrangement, wherein the panel, the wiper arrangement, and the fluid distribution arrangement are contained in the enclosure, and wherein the fluid distribution arrangement is configured to dispense a fluid onto the surface and the wiper is configured to sweep over the surface.

10. The vehicle of claim 9 further including:
a compartment carried on the chassis, the compartment configured to contain cargo, wherein the components arrangement is carried in the compartment.

11. The vehicle of claim 9 wherein the components arrangement further includes:
a fastener arrangement configured to fasten the components arrangement to the vehicle; and
a communications arrangement, the communications arrangement configured to enable the wiper arrangement to be controlled, wherein the fastener arrangement and the communications arrangement are at least partially contained in the enclosure.

12. The vehicle of claim 11 wherein the communications arrangement is further configured to obtain information from the control system and to control the wiper arrangement based on the information.

13. The vehicle of claim 12 wherein the communications arrangement is further configured to provide data to the control system.

14. The vehicle of claim 9 wherein the components arrangement includes a camera and the enclosure includes an opening, and wherein the camera is arranged to capture an image through the opening.

15. The vehicle of claim 9 wherein the components arrangement further includes a power arrangement, the power arrangement being contained in the enclosure and configured to provide power to the wiper arrangement.

16. A vehicle comprising:
a chassis;
a propulsion system carried on the chassis, the propulsion system configured to propel the vehicle;
a control system carried on the chassis, the control system configured to enable the vehicle to operate autonomously;
an interface carried on the chassis; and
a components arrangement, the components arrangement carried on the chassis, wherein the components arrangement includes
an enclosure, the enclosure having a first external surface,
a wiper arrangement including an assembly and at least one wiper,
a fastener arrangement configured to be coupled to the interface, and
a fluid distribution arrangement, wherein the assembly and the fluid distribution arrangement are contained in the enclosure, and wherein the fluid distribution arrangement is configured to dispense a fluid onto the first external surface and the at least one wiper is configured to sweep over the first external surface.

17. The vehicle of claim 16 further including:
a front panel supported on the chassis, wherein the first external surface is flush with the front panel.

18. The vehicle of claim 17 wherein the front panel includes a plurality of headlights, and wherein the first external surface is located between the plurality of headlights relative to an x-axis and a y-axis.

19. The vehicle of claim 16 wherein the components arrangement further includes a power arrangement arranged to provide power to the wiper arrangement and a defroster arrangement arranged to provide heat to the first external surface, the power arrangement being contained within the enclosure.

20. The vehicle of claim 16 wherein the components arrangement further includes a communications arrangement, the communications arrangement being configured to obtain information from the control system.

* * * * *